United States Patent [19]

Sambur

[11] 4,032,711
[45] June 28, 1977

[54] SPEAKER RECOGNITION ARRANGEMENT

[75] Inventor: Marvin Robert Sambur, Randolph Township, Morris County, N.J.

[73] Assignee: Bell Telephone Laboratories, Incorporated, Murray Hill, N.J.

[22] Filed: Dec. 31, 1975

[21] Appl. No.: 645,520

[52] U.S. Cl. .............................................. 179/1.5 B
[51] Int. Cl.² ......................................... G10L 1/00
[58] Field of Search ................... 179/1.5 B, 1.5 A

[56] References Cited

UNITED STATES PATENTS

| 3,466,394 | 8/1969 | French ...................................... | 179/1 |
| 3,509,280 | 4/1970 | Jones ........................................ | 179/1 |
| 3,700,815 | 10/1972 | Doddington ............................. | 179/1 |

OTHER PUBLICATIONS

Atal, B., "Effectiveness of Linear Prediction ... for Automatic ... Verification," J. of Ac. Soc. Am., June 74.
Furui et al., "Talker Recognition, etc.," Elec. and Comm. in Japan, vol. 56-A, No. 11, 1973.
Pruzanski et al., "Talker Recognition etc., " J. of Ac. Soc. Am. vol. 36, No. 11, Nov. '64.

Primary Examiner—William C. Cooper
Assistant Examiner—E. S. Kemeny
Attorney, Agent, or Firm—J. S. Cubert

[57] ABSTRACT

This speaker recognition system offers improved recognition by comparing the mean and variance of an unknown (test) speaker's Orthogonal Parameter signals versus those of previously-stored known (reference) speakers. The unknown speaker's Orthogonal Parameters represent his hypothesized identity because his original speech linear prediction coefficients are transformed into his set of Orthogonal Parameters using the stored (reference) transformation coefficients of each of the previously-recorded known speakers.

31 Claims, 9 Drawing Figures

SPEAKER RECOGNITION ARRANGEMENT

BACKGROUND OF THE INVENTION

My invention relates to speech analysis and, more particularly,, to recognition systems for identification or verification of a speaker on the basis of selected acoustic parameters unique to his person.

It is often important to identify or verify the identity of an individual from physical characteristics related to his speech. Such a procedure is desirable for transactions conducted over the telephone, for rapid credit verification, or for security arrangements such as controlled admittance to secured areas. Priorly, automatic speaker recognition systems have been based on the comparison of a predetermined spoken message with a previously stored reference of the same or a similar message, or a comparison between selected parameters of particular utterances made by the individual with previously stored parameters of a corresponding utterance. Such parameters may be derived from speech characteristics such as pitch period, intensity, a particular formant of frequency or its bandwidth, or some property of the glottal wave.

In one system such as disclosed in U.S. Pat. No. 3,466,394, issued to W. K. French Sept. 9, 1969, selected peaks and valleys of each pitch period are utilized to obtain characteristic coordinates of a voiced input of an unknown speaker, which coordinates are selectively compared against those of one or more previously stored reference coordinates. As a result of the comparison, a decision is made as to the identity of the unknown speaker. This arrangement, however, requires that the characteristic coordinates be normalized with respect to intensity to prevent errors occasioned by the individual's use of a different intensity than used when the reference coordinates were obtained.

Another arrangement, such as disclosed in G. R. Doddington et al U.S. Pat. No. 3,700,815 issued Oct. 24, 1972 and assigned to the same assignee, compares the characteristic way an individual utters a test sentence with a previously stored utternance of the same sentence. This comparison, however, requires a temporal alignment of the test and reference utterances. Accordingly, the time scale of the test utterance is warped to bring it into time registration with the reference sentence before the comparison is made.

These and other techniques presently used are based on characteristics of speech that are dependent on the content of the utterance. A more effective method can be based on a speaker recognition feature that reflects the unique properties of the speaker's vocal apparatus and not the content of the utterance Speech analysis based on the linear predictability of the speech waveform provides a set of characteristics that are desirable for automatic speaker recognition. These characteristics represent combined information about the formant frequencies, their bandwidth, and the glottal wave and are substantially independent of pitch and intensity information.

A speaker recognition arrangement based on comparison of linear prediction characteristics of an unidentified speaker with previously stored linear prediction characteristics of known speakers is not restricted to selected speech features such as formant frequencies and the glottal wave. Thus, the linear prediction characteristics can form a more complete basis for speaker recognition. The use of linear prediction characteristics for speaker recognition, however, generally requires segmentation or time normalization since the characteristics include both linguistic and speaker dependent information.

It is an object of the invention to provide speaker recognition which is substantially independent of the linguistic content of the speech signal and avoids alignment of signal characteristics.

BRIEF DESCRIPTION OF THE DRAWING

FIG. 9 shows a detailed block diagram of the minimum deviation signal detector of FIG. 2.

SUMMARY OF THE INVENTION

Figure 1:
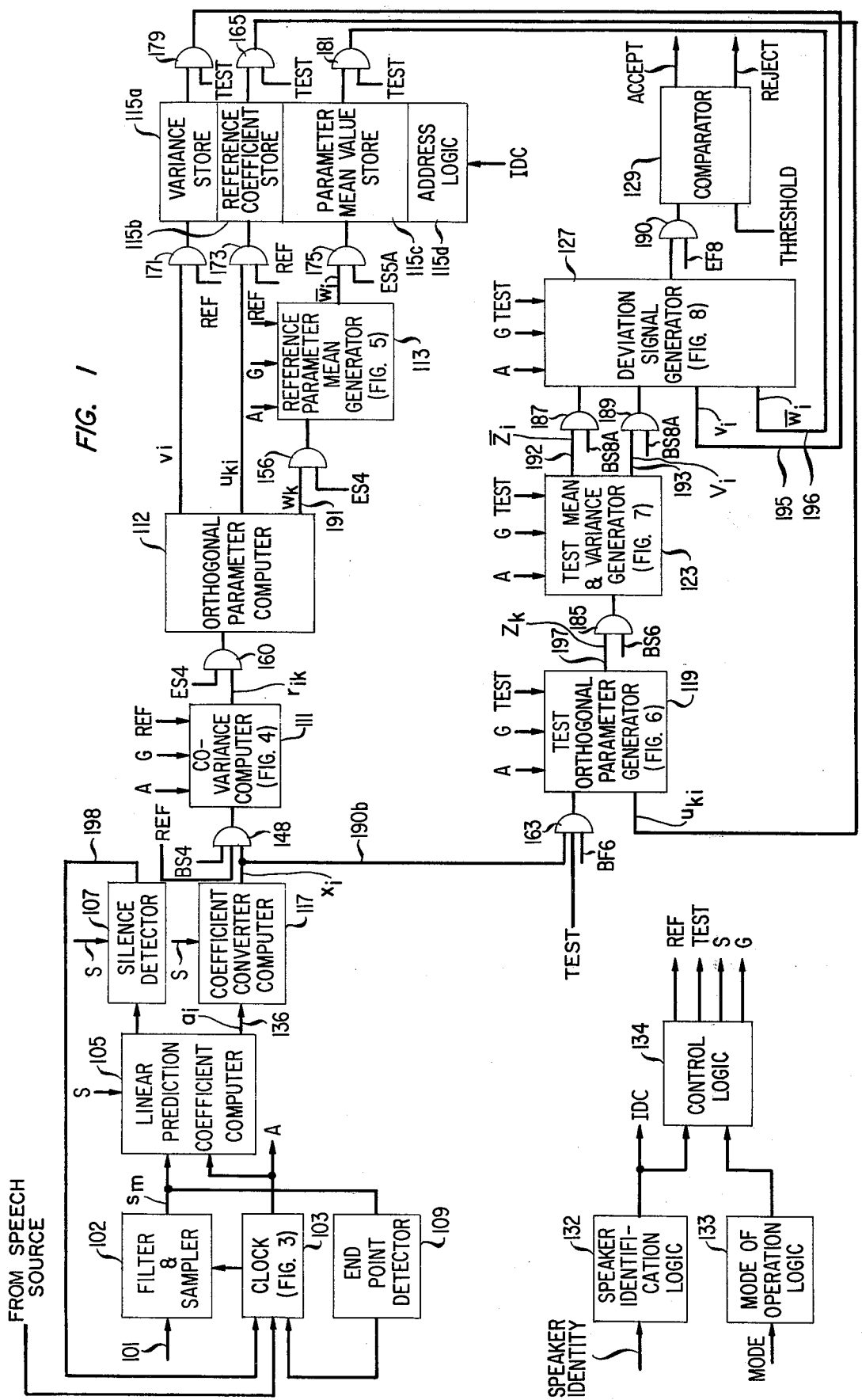
FIG. 1 depicts a block diagram of a speaker verification system illustrative of the invention.

My invention is directed to a speaker recognition system based on a linear prediction analysis of speech samples. It has been observed that the prediction parameters obtained from such an analysis are, in general, highly redundant; and that a set of statistically independent orthogonal parameters may be formed by linear combinations of prescribed linear prediction parameters. Only a small subset of the formed orthogonal parameters demonstrates significant variation across an analyzed utterance. Thus, high quality speech synthesis can be achieved using the formed subset and only the particular mean values of remaining orthogonal parameters since the remaining orthogonal parameters are effectively constant. These remaining orthogonal parameters are particularly useful for speaker recognition because they contain almost no linguistic information but are highly indicative of the speaker's physical characteristics.

In accordance with the invention, a set of reference prediction parameter signals is formed from a prediction analysis of the utterances of an identified speaker. Responsive to said prediction parameter signals, a prescribed set of reference coefficient signals adapted to transform the prediction parameter signals of the identified speaker into a set of signals which are representative of te identity of the identified speaker and are highly indicative of the particular identified speaker's physical characteristics are formed. The prediction parameter signals of the identified speaker are combined with said speaker's reference coefficient signals to form a prescribed set of first signals that are characteristic of the identity of said speaker. A set of prediction parameter signals is formed from a prediction anaylsis of an unknown speaker. The prediction parameter signals of the unknown speaker are combined with the reference coefficient signals of the identified speaker to form a set of test prediction parameter signals which are representative of an hypothesized identity of the unknown speaker with reference to the identified speaker. Responsive to said test prediction parameter signals, a prescribed set of second signals characteristic of the hypothesized identity of the unknown speaker is generated. The prescribed set of first signals representative of the identified speaker's physical characteristics is compared with the prescribed set of second signals representative of the hypothesized identity of the unknown speaker as the identified speaker whereby the identity of the unknown speaker is recognized.

In accordance with one aspect of the invention, the prescribed set of first signals are formed from a set of orthogonal prediction parameter signals derived by means of said reference coefficient signals from said identified speaker's prediction parameter signals and substantially independent of the linguistic content of said identified speaker's utterances but representative of the physical characteristics of said identified speaker. The prescribed set of second signals are orthogonal prediction parameter signals representative of the hypothesized identity of the unknown speaker as said identified speaker which are derived from the combination of prediction parameters formed from a prediction analysis of the unknown speaker's utterances and the reference coefficient signals of the identified speaker.

In accordance with yet another aspect of the invention of the comparison of prescribed sets of first and second signals comprises a comparison of the mean values of the identified speaker's signals indicative of the physical characteristics of the identified speaker with the mean values of the hypothesized identity orthogonal parameter signals indicative of the physical characteristics of said unknown speaker with reference to said identified speaker.

In accordance with yet another aspect of the invention, utterances of each plurality of identified speakers are analyzed, and a prescribed set of orthogonal prediction parameters representative of the physical characteristics of each indentified speaker is generated by means of said reference coefficient signals for said identified speaker. The mean and variance values for each speaker identifying orthogonal parameter signals are produced. The reference conversion coefficient signals, and the means and variances for the orthogonal parameters for each of a plurality of identified speakers are stored.

Upon receipt of a speech sample from an unknown speaker, a test set of orthogonal parameters is generated from the combination of the test speaker's prediction parameters and the set of stored reference conversion coefficient signals corresponding to the hypothesized identity of said unknown speaker as a selected identified speaker. The mean value and variance of each test orthogonal parameter is generated, and a signal corresponding to the deviation of the mean values and variances of the test set orthogonal parameters and the previously stored mean values and variances of the orthogonal parameters of a selected identified speaker is generated to detect whether the test speaker is the previously identified speaker. In this manner, a test speaker may be uniquely recognized as one of the plurality of identified speakers.

In accordance with yet another aspect of the invention, the utterances of each of a plurality of identified speakers are sampled to develop signals corresponding to a set of prediction parameters defining said utterances. Responsive to said prediction parameter signals, a set of reference coefficient signals is generated which are operative to transform the prediction parameter signals into a prescribed set of statistically independent orthogonal prediction parameter signals representative of the physical identity of the speaker. The prediction parameter signals of the identified speaker are combined with the reference coefficient signals of the same identified speaker to form said prescribed set of statistically independent orthogonal signals representative of the physical identity of said identified speaker. Said reference coefficient signals for each identified speaker, and signals corresponding to the mean value and variance of each of said orthogonal parameter signals for each identified speaker are generated and stored. The utterances of a subsequent unidentified speaker are analyzed to develop a test set of prediction parameter signals. The test prediction parameter signals are combined with the stored reference coefficient signals of a selected identified speaker to form a test set of orthogonal parameters, which test set is representative of the hypothesized physical identity of the unknown speaker referenced to the physical identity of the selected identified speaker, and the signal corresponding to the mean value and variance of each of said test set orthogonal parameter signal is combined with the mean and variance signals of the corresponding stored orthogonal parameter signals to form a signal representing the deviation of the test speaker's hypothesized characteristics from the reference speaker's characteristics.

In accordance with yet another aspect of the invention, a set of reference coefficient signals for each of a plurality of identified speakers is stored along with a set of means, and a set of variances for the orthogonal prediction parameter signals of the utterances of each identified speaker. A test speaker asserts an identity of one of the identified speakers for which reference, mean and variance signals have been stored. The utterances of the test speaker are analyzed to develop a set of prediction parameters and signals corresponding to said prediction parameters are combined with the stored reference coefficient signals of the asserted identity to form a set of signals corresponding to test orthogonal prediction parameters representative of the hypothesized physical identity of the unknown speaker referenced to the physical characteristics of the asserted identity. The mean and the variance of each of the test orthogonal parameter signals is generated, and a signal corresponding to the deviation of the mean and variance signals of the hypothesized test orthogonal parameters from the reference orthogonal parameters previously stored for the identified speakers is produced. If the asserted identity is correct, the deviation signal falls below a predetermined threshold. A comparison of the deviation signal with the predetermined threshold results in an output indicating acceptance or rejection of the asserted identity.

According to yet another aspect of the invention, a test speaker can be identified as a particular one of a set of previously identified speakers. A set of hypothesized test orthogonal parameter signals for the unknown speaker is generated from the reference coefficient signals of each of the previously identified speakers and the prediction parameter signals derived from the utterances of the unknown speaker. A deviation signal is produced for each identity and the minimum of the deviation signals corresponding to the identity of the test speaker is detected.

DETAILED DESCRIPTION

A speaker verification arrangement, illustrative of the invention, is shown in FIG. 1 wherein speaker-identification code logic 132 is operative to produce a code signal IDC corresponding to the asserted identity of the speaker. A signal is applied to mode selector 133 to indicate whether reference information is to be stored for the identified speaker or the speaker's identity is to be verified. Mode selector 133 applies a signal to control logic 134 to place the system of FIG. 1 into reference mode or test mode. In the reference mode, the utterances of the speaker identified by the IDC code from logic 132 are analyzed and reference signals, means signals and variance signals corresponding to a prediction analysis of the speech sample on line 101 are generated and stored. In the test mode, orthogonal parameter signals are generated from the stored reference signals of the asserted identity and the prediction parameters of the unknown speaker. Reference, mean and variance signals corresponding to the asserted identity of the test speaker are produced, and the test mean and variance signals are compared with the stored reference mean and variance signals of the asserted identification.

For purposes of illustration, assume that control logic 134 places the verification system of FIG. 1 in reference mode by generating output signals REF and S and G. The speech signal of the reference speaker is applied to filter and sampler circuit 102 from line 101. Line 101 may, for example, be a telephone line. The bandpass of the input speech signal is limited to the range between 100 Hertz and 4 Kilohertz and the band limited signal is sampled at a 10 Kilohertz rate under control of clock 103. It is to be understood that other frequency ranges and other sampling rates may be used. End point detector 109 receives the output of circuit 102. On the basis of the energy content of the speech signal obtained from a summation of the absolute values of the sampled outputs, the end of the utterance is detected so that clock 103 may be turned off via gate 140. At the beginning of each new utterance, a signal from detector 109 turns on clock 103. An endpoint detection arrangement suitable for use in FIG. 1 is disclosed in L. R. Rabiner et al U.S. Pat. No. 3,909,532 issued Sept. 30, 1975 and assigned to the same assignee.

Figure 3:
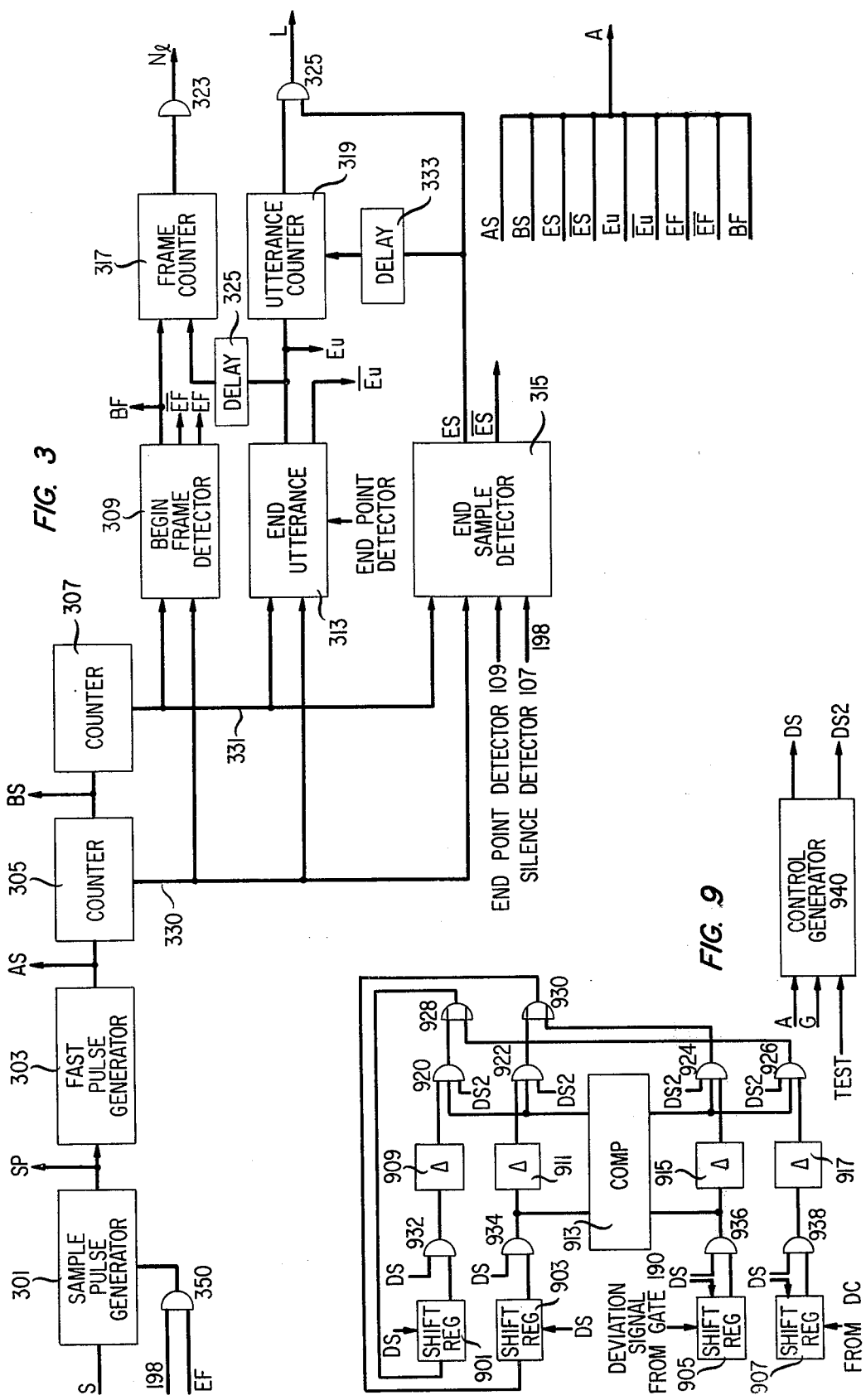
FIG. 3 shows a detailed block diagram of the clock circuits of FIGS. 1 and 2.

Clock 103, shown in FIG. 3, includes sample pulse generator 301 from which equally spaced pulses SP at the 10 kHz sampling rate are obtained. The SP pulses are applied to sample circuit 102 wherein coded samples of the speech signal are obtained. The output of generator 301 is also applied to pulse generator 303. The SP pulses from generator 301 synchronize the operation of generator 303, which produces 144 equally spaced AS pulses during each frame of 200 SP sampling pulses from generator 301. The AS pulses are applied to counter 305, which generates an output pulse BS coincident with every twelfth AS pulse. Consequently, 12 equally spaced BS pulses are produced during each frame of 144 AS pulses. The state of counter A appears on line 330. Counter 307 is responsive to the BS pulses appearing at the output of counter 305, and the state of counter B appears on line 331. Counter A is reset every twelfth AS pulse, and counter B is reset every twelfth BS pulse. The AS and BS pulses and other clock signals are distributed to other sections of FIG. 1 via line A to control the timing of operations in said other sections.

The outputs of counters 305 and 307 on lines 330 and 331 are also applied to begin frame detector 309 which generates a pulse jointly responsive to the zero states of counters A and B. This pulse defines the beginning of each frame of 200 SP sample pulses during which 144 AS pulses and 12 BS pulses occur. The output of detector 309 is applied to frame counter 317, which counts the number of frames in each utterance of the speech sample applied to filter and sampler 102. End utterance detector 313 is responsive to both counters A and B being in their twelfth states and a signal from the output of end point detector 109 to provide end utterance signals EU and $\overline{EU}$. Signal EU is applied to counter 317 through delay 335 to reset counter 317 at the end of each utterance and is directly applied to utterance counter 319 which is operative to count the number of utterances in the speech sample.

End sample detector 315 is jointly responsive to the states of counters 305 and 307, end point detector 109, and silence detector 107 to produce ES and $\overline{ES}$ (End Sample) signals at the end of the speech sample. Signal ES is applied through delay 333 to reset utterance counter 319 at the end of the speech sample. The detection of an end point coincidence with a silent interval at the end of a frame generates the ES and $\overline{ES}$ signals.

For purposes of calculating the means and variances of orthogonal parameters in the system of FIG. 1, it is necessary to have available the number of frames that occur in each utterance and the number of utterances in the speech sample. The number of frames N, which varies from utterance to utterance, is available at the output of frame counter 317. This output is sampled in gate 323 upon the occurrence of the EU signal at the end of each utterance. The output of gate 323 provides coded signal N which corresponds to the number of frames in the just-ended utterance. Gate 325 samples the state of utterance counter 319 at the end of the speech sample detected in detector 315 so that the L coded signal corresponding to the number of utterances in the speech sample is available at the end of each speech sample.

The sequence of sample signals at the 10kc rate is applied from the output of filter and sampler circuit 102 to linear prediction coefficient computer 105, wherein the samples $s_m$ are stored in blocks or frames of two hundred coded signals, $s_1$ through $s_{200}$. It is to be understood that other frame arrangements may be used. A linear prediction analysis of the sampled speech signal is made in accordance with $$s_m = \sum_{i=1}^{p} a_i s_{m-i} \qquad (1)$$

where $m=1,2,\ldots,200$ $i=1,2,\ldots,p$
and $p$ is the number of poles of the prediction analysis model. The linear prediction analysis is based on the all pole linear prediction filter model well known in the art and described in "Speech Analysis and Synthesis by Linear Prediction of the Speech Wave" by B. S.. Atal and S. L. Hanauer, *Journal of Arcoustic Society of America*, Vol. 50, pp. 637–655, 1951. For purposes of speaker recognition it has been found that a 12 pole filter model is adequate. It is to be understood, however, that other pole arrangements may be used.

The linear prediction coefficients $a_i$ are the coefficients of the sampled speech signals $s_m$ in accordance with the representation of equation (1). For the 12 pole filter model used in FIG. 1, the coefficients $a_1$ through $a_{12}$ are generated in coefficient computer 105 in each frame of 200 samples by the correlation of the sampled speech signals $s_m$ in accordance with equations (2) and (3).

$$y_k = \sum_{m=1}^{M} s_{m-k}s_m, \quad k = 1,2 \ldots p \quad (2)$$

$$y_k = \sum_{i=1}^{p} a_i y_{|i-k|}, \quad k = 1,2 \ldots p \quad (3)$$

where M is the number of samples in each frame (M=200) and $p$=12.

As is well known in the art, the linear prediction coefficients $a_i$ of equation (1), are chosen to minimize the mean squared prediction error in accordance with equations (2) and (3). As set forth in equation (2), this is done by a correlation analysis of the block of sample signals $s_m$ through $s_{m+M}$. The resulting linear prediction coefficients $a_1$ through $a_{12\ 12}$ are obtained for each frame of M speech samples (M=200).

Linear prediction coefficient computer 105 may be the prediction parameter computer shown and described in U.S. Pat. No. 3,631,520 to B. S. Atal, issued Dec. 28, 1971. This computer arrangement produces linear prediction parameters in accordance with the covariance method well known in the art. Alternatively, any computer such as the PDP11 or Nova 800 on which the fortran language program of Appendix A of "Formant Tra jectory Estimation from a Linear Least-Squares Inverse Filter Formulation," by John D. Markel, Speech Communications Research Laboratory, Inc., Monograph No. 7, October 1971, can be implemented may be used. This fortran program is based on the correlation method well known in the art. Each frame is 20 ms in duration and, as is readily apparent, the coefficients $a_1$ through $a_{12}$ of the frame are available on output line 136 at the end of the frame of corresponding samples $s_1$ through $s_{200}$. Coefficients $a_1$ through $a_{12}$ derived from either the covariance or correlation methods may be used in the arrangement of FIG. 1.

While the linear prediction coefficients $a_i$ may be used directly to generate a set of orthogonal parameters, it has been found advantageous to use other prediction coefficients well known in the art, such as Parcor or log area coefficients, instead. The Parcor coefficients are directly derivable from the linear prediction coefficients of computer 105. The Parcor coefficients are related to the characterization of the all pole filter in terms of a nonuniform acoustic tube formed by cascading p-uniform cylindrical sections of equal length. The Parcor coefficients correspond to reflection properties of the acoustic tube sections and are related to the linear prediction coefficients in accordance with Equation (4a):

$$K_i = a_i^{(i)} \quad (4a)$$

where $K_i$ is the $i^{th}$ Parcor coefficient, $i = 1,2,\ldots,p$ and $a_i^{(j)}$ is the $i^{th}$ linear prediction coefficient for a $j^{th}$ pole linear prediction model ($j$=1,2 ... ,$p$). The log area coefficients are similarly related to the nonuniform acoustic tube model and are uniquely derivable from the linear prediction coefficient obtained from computer 105 in accordance with Equation (4b):

$$A_i = \log\left(\frac{1 + K_i}{1 - K_i}\right). \quad (4b)$$

Coefficient converter computer 117 is operative to generate a set of prediction parameters such as the Parcor from the linear prediction coefficients $a_i$ and includes arithmetic circuitry operative in accordance with Equations (4a) or (4b) or may be a computer such as the PDP11 or Nova 800 on which the program stated in Fortran language on page 128 of "Linear Prediction of Speech-Theory and Practice" by J. D. Markel, A. H. Greag, Jr. and H. Wakita, Speech Communications Researach Laboratory, Inc., Monograph No. 10, September 1973 can be implemented.

The prediction coefficients $x_i$ obtained from conversion computer 117 are applied to gate 148. Gate 148 is operative during each frame of the reference mode under control of signal BS4 from control generator 450 to direct the prediction coefficient signals $x_1, \ldots, x_{12}$ of the frame into covariance generator 111 during the same frame at the BS rate (12 per frame). Silence detector 107 is responsive to the generated speech samples $s_m$ in computer 105 to turn off clock 103 during the frames of silence via gate 350 and the end of a frame. Silence detector 107 may be any of the well-known silence detectors responsive to the energy or spectral characteristics of the speech signal, such as disclosed in patent application Ser. No. 627,865 of J. J. Dubnowski et al to provide a signal to gate 350 of clock 103 via lead 198 which prevents the generation of prediction parameter signals during the frames characterized as silence.

Covariance generator 111 is operative to produce a plurality of signals corresponding to the mean covariance matrix $\bar{R}$ obtained from the prediction parameter signals applied thereto during the speech sample. As is well known in the art, the covariance matrix is derived from a statistical analysis of the deviation of the prediction parameters from selected mean values of the parameters. The covariance generator produces selected mean values of the prediction coefficients $x_i$ in accordance with Equation (5):

$$\bar{x}_i = \frac{1}{N} \sum_{n=1}^{N} x_{in} \quad i = 1,2 \ldots , p \ (p = 12) \quad (5)$$

where N is the number of frames in the utterance; and $x_{in}$ is the $i^{th}$ prediction parameter of the $n^{th}$ frame. As is well known in the art, the covariance matrix $\underline{R}$ is comprised of elements $r_{ik}$ which are defined in Equation (6).

$$r_{ik} = \frac{1}{N} \sum_{n=1}^{N} (x_{in} - \bar{x}_i)(x_{kn} - \bar{x}_k) \quad (6)$$

$$= \frac{1}{N} \sum_{n=1}^{N} [x_{in}x_{kn}] - \bar{x}_i \bar{x}_k \quad (6a)$$

$$\underline{R} = \{r_{ik}\}, \, i,k = 1,2 \ldots p. \quad (6b)$$

The covariance matrix $\underline{R}$ is a p-by-p matrix which for $p = 12$ has 144 elements. The covariance matrix $\underline{R}_l$ denotes the covariance matrix calculated for the $l^{th}$ utterance of the given speaker. The mean covariance matrix for all the utterances of the identified speaker $\bar{\underline{R}}$ is obtained from averaging in accordance with Equation (7):

$$\bar{\underline{R}} = \frac{1}{L} \sum_{l=1}^{L} \underline{R}_l \qquad (7)$$

where L is the number of utterances in a speech sample of a given speaker. Equation (7) is given by way of example. It is to be understood that other well-known formulations for the calculation of $\bar{\underline{R}}$ may be used. Thus, the mean covariance matrix $\bar{\underline{R}}$ represents the statistical analysis of the utterances of the speech sample of the identified speaker from which reference orthogonal parameters are to be produced in orthogonal parameter generator 112 during the reference mode.

Figure 4:
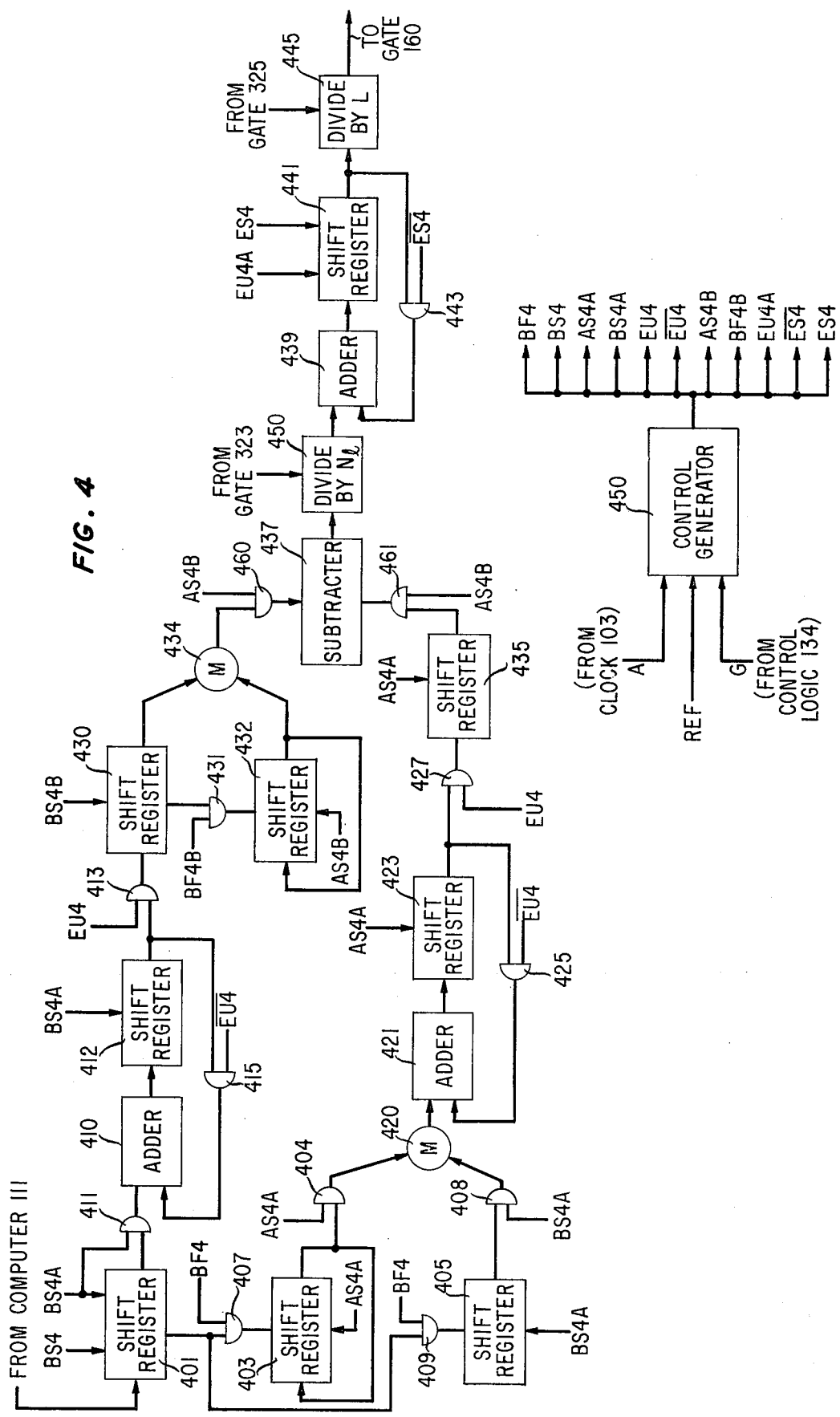
FIG. 4 shows a detailed block diagram of the covariance computer of FIGS. 1 and 2.

Covariance generator 111 comprises a plurality of arithmetic units adapted to generate signals corresponding to the specified mean values of the prediction parameters $x_i$ and coded signals corresponding to the elements of the mean covariance matrix $\bar{\underline{R}}$. An arrangement for generating coded signals corresponding to the elements of the mean covariance matrix $\bar{\underline{R}}$ is shown in FIG. 4. Referring to FIG. 4, shift register 401, adder 410, and shift register 412 are operative in combination to generate signals corresponding to the means $\bar{x}_i$ of Equation (5). Shift register 401 is a 24-stage register adapted to receive the prediction coefficients $x_1, \ldots, x_{12}$ from the conversion computer 117 via gate 148 during each frame of 200 speech samples. Control generator 450 is responsive to signals from clock 103 and signals from logic 134 to provide a set of control signals for the operation of FIG. 4 including an enabling pulse BS4 for each frame in which $x_i$ signals are to be transferred into register 401 via gate 148 of FIG. 1. The 12 BS4 pulses are also applied during this interval to register 401 to control the shift rate thereof. The BS4A pulses obtained from generator 450 after register 401 is filled are operative to apply the 12 least significant $x_i$ signals in register 401 to one input of adder 410.

In accordance with Equation (5), the $x_i$ outputs of shift register 401 are sequentially applied to adder 410 via gate 411. In adder 410, each prediction parameter $x_i$ is added to the corresponding prediction parameter $x_i$ of the previous frame obtained from shift register 412. Register 412 is shifted under control of shifting pulses BS4A from generator 450. The output of adder 410 is successively shifted into register 412 under control of BS4A pulses. At the end of each utterance, shift register 412 contains the accumulated sums of the prediction parameters of the utterance, $\Sigma x_1, \ldots \Sigma x_{12}$. Each sum is proportional to the mean value of the corresponding one of the 12 prediction parameters.

At the beginning of each frame, the least significant 12 parameters stored in register 401 are transferred in parallel to shift registers 403 and 405 through gates 407 and 409, respectively. This is done under control of the BF4 signal from generator 450 which signal occurs at the beginning of each frame for which prediction parameters $x_i$ are available. Shift register 405 applies the prediction parameters of the frame, $x_1, \ldots x_{12}$, in succession to one input to multiplier 120 via gate 404 at the rate of 12 shifts per frame under control of BS4A pulses from generator 450.

Shift register 403 is a rotating type shift register which applies the stored prediction parameters in succession to the other input of multiplier 420 and also returns the output parameter to the input of the shift register. Register 403 is shifted at a rate of 144 shifts per frame under control of the AS4A pulses while register 405 is shifted at a rate of 12 shifts per frame under control of BS4A pulses from generator 450. Twelve spaced shifting control pulses AS4A occur during the interval of two successive BS4A pulses whereby there are 12 successive shifts of regisster 403 for each shift of register 405. In this manner, multiplier 420 is operative to provide 12 successive products for each $x_k$ output of shift register 405 to obtain 12 products $x_{in}x_{kn}$; for each shift of register 405 in accordance with the requirements of Equation (6a).

The output of multiplier 420 is applied to adder 421 in which the currently produced product is added to the sum of the corresponding product of the previous frames. The resulting output of adder 421 is applied to shift register 423 under control of shift pulses AS4A. Shift register 423, operative at a rate of 144 shifts per frame controlled by AS4A pulses stores the current accumulated sum of each of the 144 product outputs of multiplier 420 at the end of each frame.

At the end of each utterance shift register 412 contains 12 coded signals corresponding to the means $\bar{x}_i$ ($i = 1,2 \ldots ,12$) of Equation (5) and shift register 423 stores the summed 144 products $$\sum_{n=1}^{N} x_{in}x_{kn}$$

in accordance with Equation (6a). At the end of each utterance, gate 413 is opened under the control of signal EU4 which is generated in pulse generator 450 responsive to the end utterance signal EU from FIG. 3 via line A. Signal EU4 has a duration of one frame. The coded signals to $\bar{x}_1, \ldots ,\bar{x}_{12}$ are successively shifted into register 430 under control of shifting signal AS4B (144 pulses per frame) produced by generator 450.

When shift register 430 is filled, gate 431 is opened by signal BF4A from generator 450 and the 12 signals in register 430 are transferred in parallel into shift register 432. Register 430 is now shifted under control of signal BS4B. Register 432 is a rotating type shift register operated under control of shifting signal AS4B from generator 450, whereby the 12 signals in register 432 successively appear at one input of multiplier 434 while one signal from register 430 appears at the other input of multiplier 434. In this manner, 144 products are sequentially obtained from the output of multiplier 434.

At the end of each successive utterance, the contents of shift register 423 is serially shifted into delay shift register 435 (at a rate of 144 codes per frame) via gate 427 responsive to signal EU4 under control of shift signal AS4A. During this transfer, gate 425 is operative to signal $\overline{EU4}$ to clear shift register 423. Shift register 435 is operative to delay the appearance of the $\Sigma x_{in}x_{kn}$ coded signals during the interval in which shift registers 430 and 431 are being filled. In this way, the inputs to subtractor 437 from gates 460 and 461 are aligned in accordance with Equation (6a) so that the output of subtractor 437 corresponds to Equation (6a). The output of subtractor 437 is divided by signal N obtained from gate 323 of FIG. 3 in Divide-by-N circuit 450 to produce the $r_{ik}$ elements of matrix $\underline{R}$.

At the end of each utterance, pulse generator 450 provides a signal EU4A in response to which signal shift register 441 is shifted to the right at the AS rate (144 shifts per frame). Shift register 441 stores the successive $r_{ik}$ sum elements from the utterances of the speech sample so that the stored $r_{ik}$ sum elements are added to the $r_{ik}$ elements from divider 450 in adder 439. The resulting accumulated sum is then stored in shift register 441.

At the end of the entire speech sample, shift register 441 contains the $r_{ik}$ sum elements for the mean covariance matrix $\overline{R}_N$ in accordance with Equation (6b). The elements of the $\overline{\underline{R}}$ matrix are shifted out of register 441 under control of shifting signal ES4 from generator 450. During this shift operation, gate 443 is responsive to signal $\overline{ES4}$ from generator 450 to inhibit the output of register 441 from being applied to adder 439, thereby clearing register 441. The output of register 441 is applied to divider 445 under control of signal ES4 occurring at the end of the speech sample whereby each $\Sigma r_{ik}$ element is divided by L obtained from counter 319 via gate 325 in FIG. 3. The output of divider 445 passes through gate 160 of FIG. 1 under control of signal ES4 for use in orthogonal parameter generator 112.

Alternatively, a general purpose computer such as the PDP11 or Nova 800 may be used to generate $\overline{\underline{R}}$ which computer is programmed to generate the elements of the mean covariance matrix $\overline{\underline{R}}$. A program in fortran language for this purpose is disclosed on pages 32 and 33 of "system/360 Scientific Subroutine Package Version III - Programmer's Manual;" Program Number 360A-CM-03X, Fifth Edition (August 1970), Copyright International Business Machines Corporation 1966, 1967, 1968. The output of covariance generator 111, $\overline{\underline{R}}$, is applied to orthogonal parameter computer 112 via gate 160 during the reference mode of operation under control of signal ES4 from control pulse generator 450.

Computer 112 is operative to generate coded signals corresponding to a prescribed set orthogonal parameters based on the statistics of the speech sample of the identified speaker. The orthogonal parameters are statistically independent and each orthogonal parameter represents a rotation of the coordinates of the prediction parameters obtained from coversion computer 117. Through this technique, a set of speaker-dependent but linquistically independent charactersitics are obtained, which characteristics form the basis of the speaker verification system of FIG. 1.

The orthogonal parameter signals are generated through an eigenvector analysis of the prediction parameters, $x_i$, responsive to the mean covariance matrix $\overline{\underline{R}}$ signals obtained from computer 111. The eigenvalues, $v_i (i = 1, \ldots, p)$ representing the variance of the orthogonal parameters across the identified speaker utterance are obtained in accordance with Equation (8):

$$|\overline{\underline{R}} - v\underline{I}| = 0 \qquad (8)$$

where $v$ represents the eigenvalues (variance) of the orthogonal parameters and $\underline{I}$ is the identity matrix. On the basis of Equation (8), a set of reference vector signals $\underline{u}_i$, each having $p$ (12) elements is obtained from Equation (9);

$$v_i \underline{u}_i = \overline{\underline{R}} \underline{u}_i \; i = 1, 2, \ldots, p \qquad (9)$$

$p = 12$.

$v_i$ is the eigenvalue of the $i^{th}$ orthogonal parameter. Each orthogonal parameter is uniquely related to the prediction coefficients $x_i$ in accordance with Equation (10).

$$w_k = \sum_{i=1}^{p} u_{ki} x_i, k = 1, 2, \ldots p \qquad (10)$$

where $u_{ki}$ represents the $i^{th}$ element of the $k^{th}$ reference vector signal. Thus, from orthogonal computer 112, a set of 12 variance (eigenvalues) $v_1, \ldots, v_{12}$, and set of 144 reference signals $u_{1,1}, \ldots, v_{12,12}$ are obtained. The reference signals $\{u_{ki}\}$ correspond to conversion coefficients which transform the prediction parameters $x_i$ into the orthogonal parameter coordinates. The set of reference signals corresponding to the $u_{ki}$s can then be used to generate a set of orthogonal parameters for a test speaker from the test speaker's prediction parameters. The set of coefficients $\{u_{ki}\}$ is stored in store 115b as addressed during the reference mode of operation by identification code signal IDC from speaker identification logic 132. In this way, a set of reference signals is available for each identified speaker in a predetermined location of store 115b. The variance (eigenvalues) signals $v_1, \ldots, v_{12}$ are similarly stored in store 115a as addressed by speaker identification code signal ID when the system of FIG. 1 is operating in reference mode.

Orthogonal parameter computer 112 may be a general purpose computer such as the PDP11 or Nova 800 adapted through one of several well-known programs to calculate the eigenvalues and corresponding eigenvectors of Equations (8) and (9). A program in fortran language for the generation of the eigenvalues, $v_i$, and the conversion coefficients $\{u_{ki}\}$ suitable for this purpose may be found in the aforementioned IBM Programmers Manual on page 164.

The signals, $w_i$ where $i = 1, 2, \ldots 12$, corresponding to the orthogonal parameters generated in computer 112 are applied to the reference mean generator 113 via gate 156. Generator 113 comprises arithmetic circuits adapted to produce the average or mean for each orthogonal parameter signal $w_i$ obtained from computer 112 in accordance with Equation (11)

$$\overline{w}_i = \frac{1}{L} \sum_{l=1}^{L} \frac{1}{N_l} \sum_{n=1}^{N_l} w_{in} \qquad (11)$$

where $w_{in}$ is the $i$th orthogonal parameter signal occurring in frame $n$; $N_l$ is the number of frames in the $l^{th}$ sample utterance of the identified speaker; and L is the total number of utterances in the speech sample of the identified speaker. Equation 11 is given by way of example. It is to be understood that other formulations for $\overline{w}_c$ may also be used. In accordance with Equation (11), generator 113 may consist of summing type logic circuitry operative on coded signals under counter control.

Figure 5:
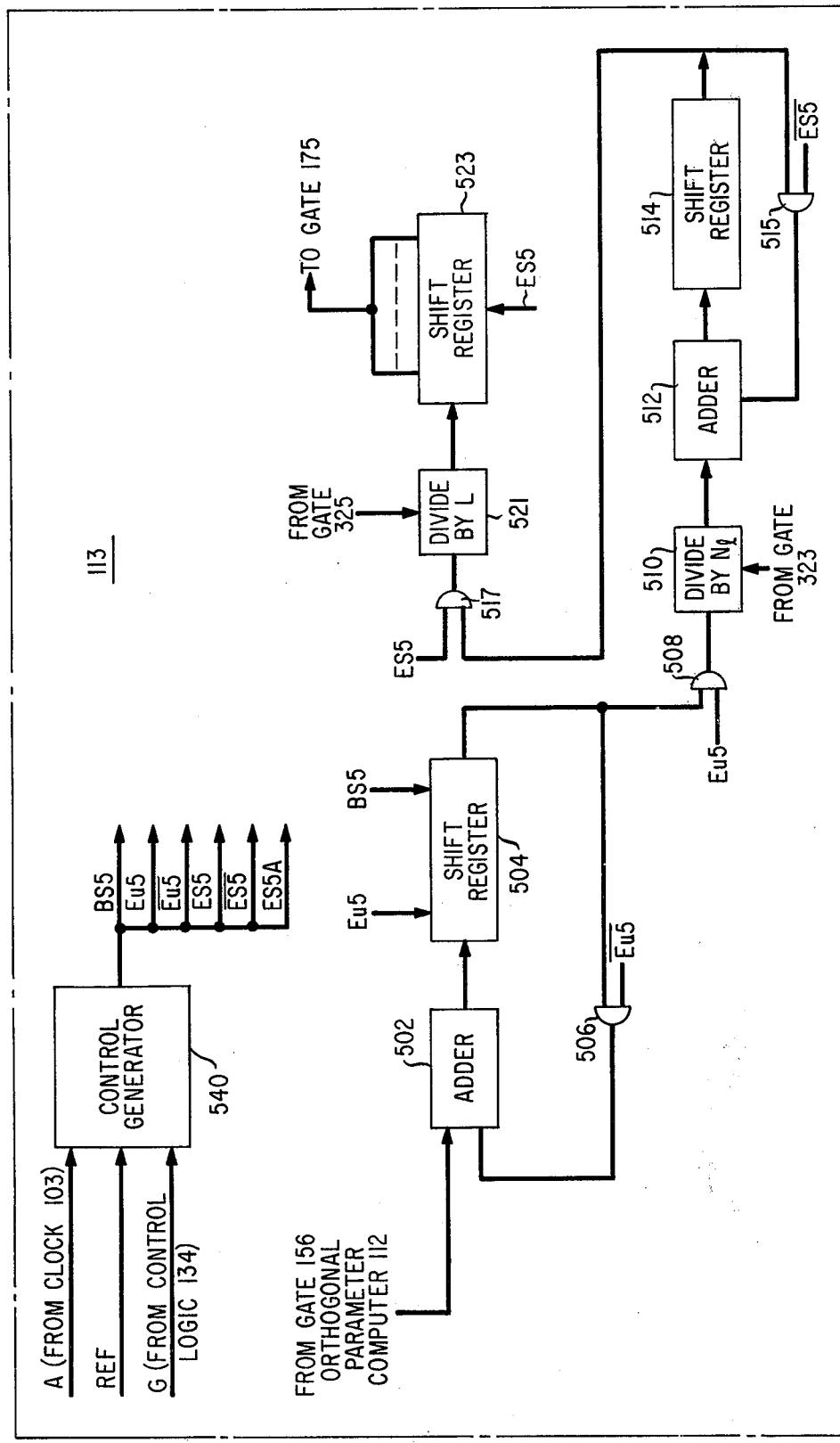
FIG. 5 shows a detailed block diagram of the reference parameter mean generator of FIGS. 1 and 2.

FIG. 5 shows an arrangement for producing the set of orthogonal parameter mean values $\overline{w}_1, \ldots, \overline{w}_{12}$ according to Equation (11). The signals $w_1, \ldots w_{12}$ are successively applied to one input of adder 502 in FIG. 5 from gate 156 under control of signal ES4 during each frame of the reference mode when computer 112 supplies orthogonal prediction parameter signals. During the first frame output of generator 112, the 12 $w_i$ signals of said first frame pass through adder 502 and are successively stored in shift register 504 under control of the BS5 shift signals from control generator 540. The occurrence of the BS5 shift pulses and the other control signals for the operation of the circuit of FIG. 5 is controlled by generator 540 responsive to signals on lines A and G from clock 103 and logic control 134, respectively. During each succeeding frame of an utterance, the $w_i$ signal outputs of that frame from generator 112 are added to the corresponding previously stored values in register 504, as indexed in Equation (11) and the resulting sum is stored in register 504. BS5 shift signals control the operation of register 504 during the summation.

At the end of the utterance, gate 508 is opened under control of the EU5 pulses from generator 540 whereby the signals from register 504 are successively applied to one input of divide-by-N circuit 510. A signal corresponding to the number of frames in the utterance is applied to the other input of divide-by-N circuit 510 from gate 323 of FIG. 3. Consequently, the outputs of circuit 510 are the mean values of the orthogonal parameters $w_i$ over the utterance $$\overline{w}_i = \frac{1}{N} \sum_{n=1}^{N} w_{in}$$

Shift register 514 contains the orthogonal parameters averaged over the previous utterances in the speech sample. Adder 512 is operative to successively add the average values of the orthogonal parameters from divide-by-N circuit 510 to the corresponding previously stored sum of average values in shift register 514. At the end of the speech sample, gate 517 is opened under control of the ES5 signal from generator 540 and the outputs of register 514 are successively applied to divide-by-L circuit 521 at the BS rate (12 shifts per frame). The other input to circuit 521 is obtained from utterance counter 319 via gate 325 in FIG. 3 so that the outputs of circuit 521 are the mean values for the 12 orthogonal parameters over the speech sample. These mean value signals $\overline{w}_i$, generated in accordance with equation (11), are successively inserted into shift register 523, read out of register 523 in parallel, and inserted into store 115c via gate 175. Gate 175 is controlled by signal ES5A from generator 540. Address logic 115d, associated with store 115c, places the mean values of the orthogonal parameter signals of the speech sample into a selected location under control of address code IDC from speaker identification logic 132 during the reference mode of operation determined by control logic 134.

At the end of the reference operation, stores 115a, 115b and 115c contain, for a given identified speaker, a set of signals corresponding to the variances $v_i$ of the 12 orthogonal parameters, a set of signals corresponding to the reference coefficients $u_{ki}$ adapted to transform later obtained test prediction parameter signals into the prescribed set of test orthogonal parameter signals, and a set of signals corresponding to the mean values $\overline{w}_i$ of the 12 orthogonal parameters. Each set is addressable in accordance with the speaker identification code IDC. The reference operation of FIG. 1 is now complete for the identified speaker. After store 115 is filled with reference signals corresponding to a plurality of identified speakers through repeated reference operations, the verification system of FIG. 1 may be used to verify the asserted identity of an unknown test speaker.

Assume, for purposes of illustration, that a speech signal from an unknown test speaker is applied to filter and sampler 102 from line 101 after the reference signals corresponding to a plurality of identified speakers are stored. Speaker identification code generator 132 is set to a code corresponding to the asserted identification of the unknown test speaker. Mode selector 133 is set to test mode and the signals TEST and S from logic 134 are activated.

Under control of signals TEST and S, the test speech signal is sampled in filter and sample 102, and coded samples of the test speech signal are applied in sequence to linear prediction coefficient computer 105. As aforementioned, computer 105 generates a set of 12 linear prediction coefficients $a_1, \ldots a_{12}$ during each frame at the BS signal rate determined by counter 305 in FIG. 3. Each frame provides 200 speech samples $s_1, \ldots, s_{200}$. The coefficients $a_1, \ldots, a_{12}$ are transformed into an alternate representation, e.g. Parcor, by coefficient converter computer 117 whereby a set of prediction parameters, $x_i$, corresponding to the test speaker is generated and made available.

The prediction parameter signals $x_i$ are applied via gate 163 to test speaker orthogonal parameter generator 119. Concurrently, store 115b is interrogated at the address of the asserted identification so that the reference coefficient signals $u_{1,1}, \ldots u_{12,12}$ corresponding to the asserted identification are read out via gate 165 into test speaker orthogonal parameter generator 119. Responsive to the prediction parameters of the test speaker from conversion computer 117 and the asserted identification reference coefficient signals from store 115b, generator 119 is operative to produce a set of test orthogonal prediction parameters, $z_1, \ldots z_{12}$ for each frame in accordance with Equation (12).

$$z_k = \sum_{i=1}^{p} u_{ki} x_i, k = 1, \ldots, p \qquad (12)$$

$x_i$ are the test prediction parameters of the unknown speaker. Generator 119 comprises product forming apparatus and circuits for summing the products in accordance with the indices of Equation (12).

Figure 6:
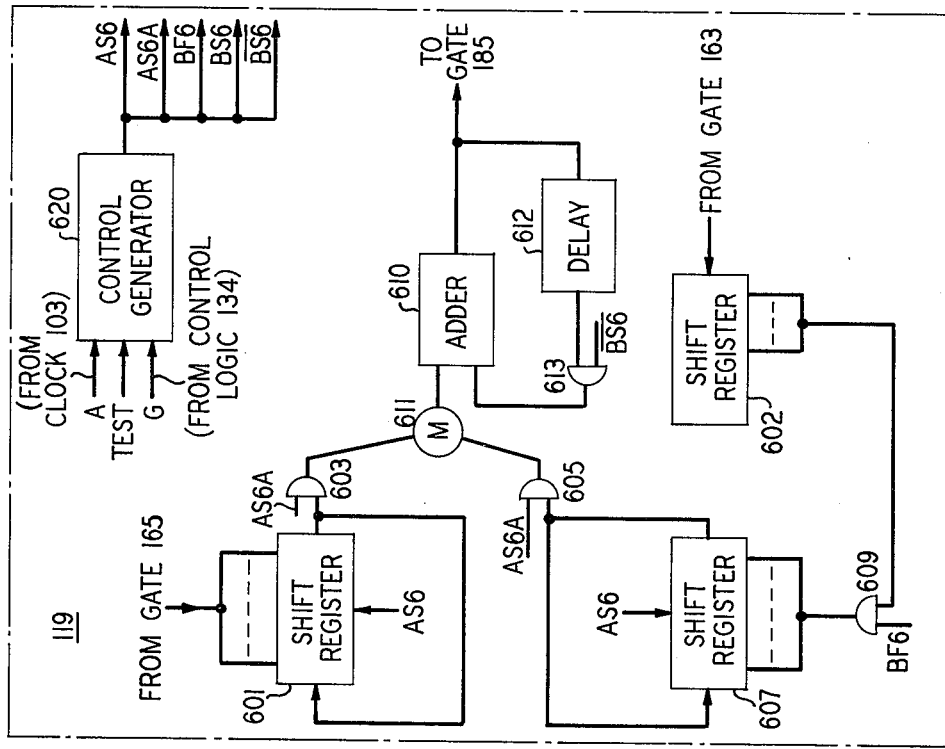
FIG. 6 shows a detailed block diagram of the test orthogonal parameter generator of FIGS. 1 and 2.

FIG. 6 shows an arrangement adapted to produce a set of test orthogonal parameters for each frame from the stored reference signals obtained from the speech sample of asserted identity and the prediction parameters obtained for the test speaker from coefficient converter computer 117 during the test mode. At the beginning of the test mode, store 115b is interrogated as addressed by the IDC code of the asserted identity. The reference signals for the asserted identity from store 115b are applied in parallel to shift register 601 via gate 165. At the end of the transfer, 144 coefficients $u_{ki}$ are placed in register 601. During each frame of the test mode, the 12 prediction parameters from gate 163 are sequentially placed in shift register 602. After 12 parameters $x_1 \ldots x_{12}$ corresponding to a frame are shifted into the 12 least significant positions of register 602, these parameters are read out in parallel from register 602 and are applied therefrom via gate 609 to shift register 607 under control of signal BF6 from control pulse generator 620.

Shift registers 601 and 607 are rotating-type shift registers. Shift registers 601 operates at the fast AS rate (144 shifts per frame) under control of signal AS6 from generator 620. Shift register 607 rotates 12 times for each rotation of shift register 601 under control of signal AS6. The outputs of registers 601 and 607 are applied via gates 603 and 605 to multiplier 611 wherein the products $u_{ki} x_i$ are formed. Thus, for each set of 12 prediction parameters, 144 products are obtained from multiplier 609. The sum of each successive set of 12 products is formed in adder 610, which has its outputs returned via one digit delay store 612 and gate 613. Multiplier 611 and adder 610 are operative at the AS (144 parameters per frame) rate. At the end of 12 AS signals, the BS6 signal from generator 620 opens gate 185 and the orthogonal parameters $$z_k = \sum_{i=1}^{p} u_{ki} x_i$$

in accordance with Equation (12) are transferred via gate 185 to test mean and variance generator 123. During the transfer of an orthogonal parameter signal, gate 613 is inhibited by signal $\overline{BS6}$ from generator 620 so that the formation of the next orthogonal parameter is started. At the end of the frame during which 12 orthogonal parameters are formed in the circuit of FIG. 6, the next set of prediction parameters corresponding to the succeeding frame is transferred from register 602 to register 607 to form the orthogonal parameters corresponding to the said succeeding frame The frame orthogonal parameters $z_1, \ldots z_{12}$ for the test speaker, obtained from generator 119, are applied to test mean variance generator 123 via gate 185 during the test mode of operation under control of signal BS6 from generator 620. Generator 123 operates to produce a signal corresponding to the means $\overline{Z}_i$ of each orthogonal parameter of the test speaker and a signal corresponding to the variance $V_i$ of each test speaker orthogonal parameter in accordance with Equations (13) and (14).

$$\overline{Z}_i = \frac{1}{N} \sum_{n=1}^{N} z_{in} \tag{13}$$

$$V_i = \frac{1}{N} \sum_{n=1}^{N} (z_{in} - \overline{z}_i)^2 \tag{14}$$

$$= \frac{1}{N} \left( \sum_{n=1}^{N} z_{in} \right)^2 - \overline{z}_i^2 \tag{14a}$$

Figure 7:
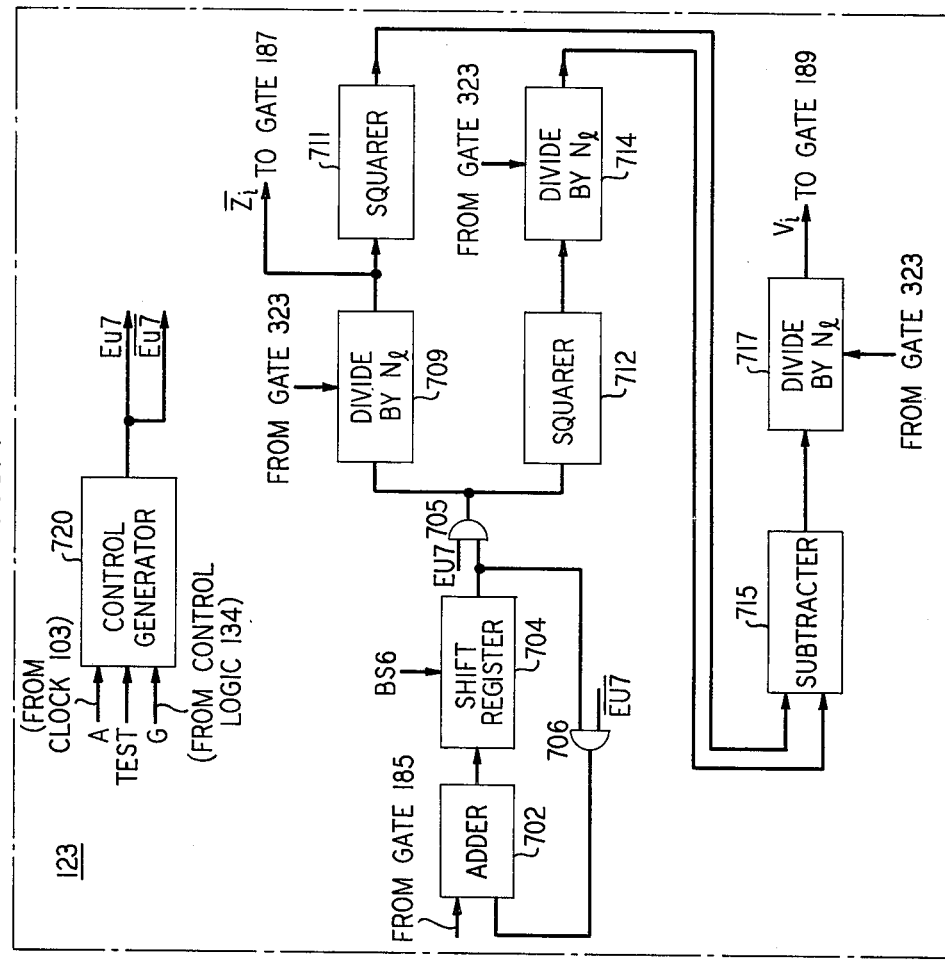
FIG. 7 shows a detailed block diagram of the test mean and variance generator of FIGS. 1 and 2.

Generator 123 comprises arithmetic units adapted to produce the required summation and averaging. FIG. 7 shows an arrangement of arithmetic units operative to produce signals corresponding to the mean values $\overline{Z}_i$ of the orthogonal parameter signals over the speech sample of the test speaker obtained from FIG. 6 and to produce a variance signal $V_i$ for each orthogonal parameter in accordance with Equation (14a). The orthogonal parameter signals from gate 185, $z_1, \ldots z_{12}$ are successively applied to adder 702 in circuit 123 at the BS rate (12 parameters per frame). Shift register 704 stores the sum of the orthogonal parameters, $\Sigma z_i, \ldots \Sigma z_{12}$. During each BS6 pulse from control generator 620 one orthogonal parameter output of register 704 is added to the corresponding orthogonal parameter from gate 185 and the result is inserted in register 704. At the end of an utterance the contents of register 704 are successively applied to divide-by-N circuit 709 via gate 705 under control of (the end utterance) EU7 signal from generator 720. At the same time, the output of register 704 is cleared by gate 706 responsive to signal $\overline{EU7}$ preparatory to the next utterance. The other input of divide-by-N circuit 709 is obtained from frame counter 317 of clock 103 in FIG. 3 via gate 323 whereby the outputs of circuit 709 are the mean test orthogonal parameter signals $\overline{Z}_i$ of the utterance in accordance with Equation (13).

The mean values of the orthogonal signals are applied to squarer circuit 711 to form coded signals $(\overline{Z}_i)^2$ which are applied to one input of subtractor 715. The successive outputs of shift register 704 at this time are also applied to squarer circuit 712 via gate 705. Squarer circuit 712 is operative to form $(Z_i)^2$ signals. These signals are applied to one input of divide-by-$N_i$ circuit 714 so that the average values of the $(Z_i)^2$ signals are applied from squarer circuit 714 to the other input of subtractor 715. The outputs of subtractor 715 are applied to divide-by-N circuit 717 in accordance with Equation (14a) so that variance signals $V_i$ are formed. In this manner, the mean value signals $\overline{Z}_i$ and the variance signals $V_i$ of the test orthogonal parameters corresponding to the unknown test speaker are formed for use in deviation signal generator 127. In accordance with the invention, the $\overline{Z}_i$ and $\overline{V}_i$ signals are produced from the stored reference signals $\{u_{ki}\}$ of the asserted identity and the prediction parameters for the test speaker rather than from an independent eigenvector analysis of the prediction parameters of the test speaker.

The outputs of generator 123, the mean value $\overline{Z}_i$ and variance $V_i$ signal for each of the test orthogonal parameters, are applied to deviation signal generator 127 via gates 187 and 189, respectively under control of signals BS8A from generator 870. Similarly, the mean values $\overline{w}_i$ of reference orthogonal parameters of the asserted identity and the variance $v_i$ of each of the reference orthogonal parameters are applied to deviation signal generator 127 from stores 115a and 115c via gates 179 and 181, respectively. The deviation signal corresponding to the characteristic difference between the test speaker's orthogonal parameters and the stored reference orthogonal parameters of the asserted identity is developed in accordance with Equation (15).

$$d = \sum_{i=1}^{p} \frac{(\overline{w}_i - \overline{Z}_i)^2}{v_i} + \frac{1}{2} \sum_{i=1}^{p} \left( \frac{V_i - v_i}{v_i} \right)^2. \tag{15}$$

A deviation signal may also be obtained from the differences of the mean values only in accordance with the first term of Equation (15). As readily seen from Equation (15), the deviation signal component for each orthogonal parameter is obtained from the difference between the reference orthogonal parameter mean $\overline{w}_i$ derived from the prediction analysis of the reference speaker whose identity is asserted and the test orthogonal parameter mean $\overline{Z}_i$ produced from the combination of the test speaker's prediction parameters and the reference coefficient of the asserted identity. The square of difference of the means $(\overline{w}_i - \overline{Z}_i)^2$ is divided by the variance $v_i$ of the reference orthogonal parameter and $(V_i - v_i)^2$ is divided by $v_i^2$ so that much greater weight is given the orthogonal parameters which are relatively constant (small variance) over the speech samples, and significantly less weight is given to the orthogonal parameters with large variation. Thus, the deviation signal is effectively a function of those orthogonal parameters which are relatively constant over the speech samples. In this manner, the deviation signal corresponds to the differences between those orthogonal parameters which are linquistically independent and highly speaker dependent.

Figure 8:
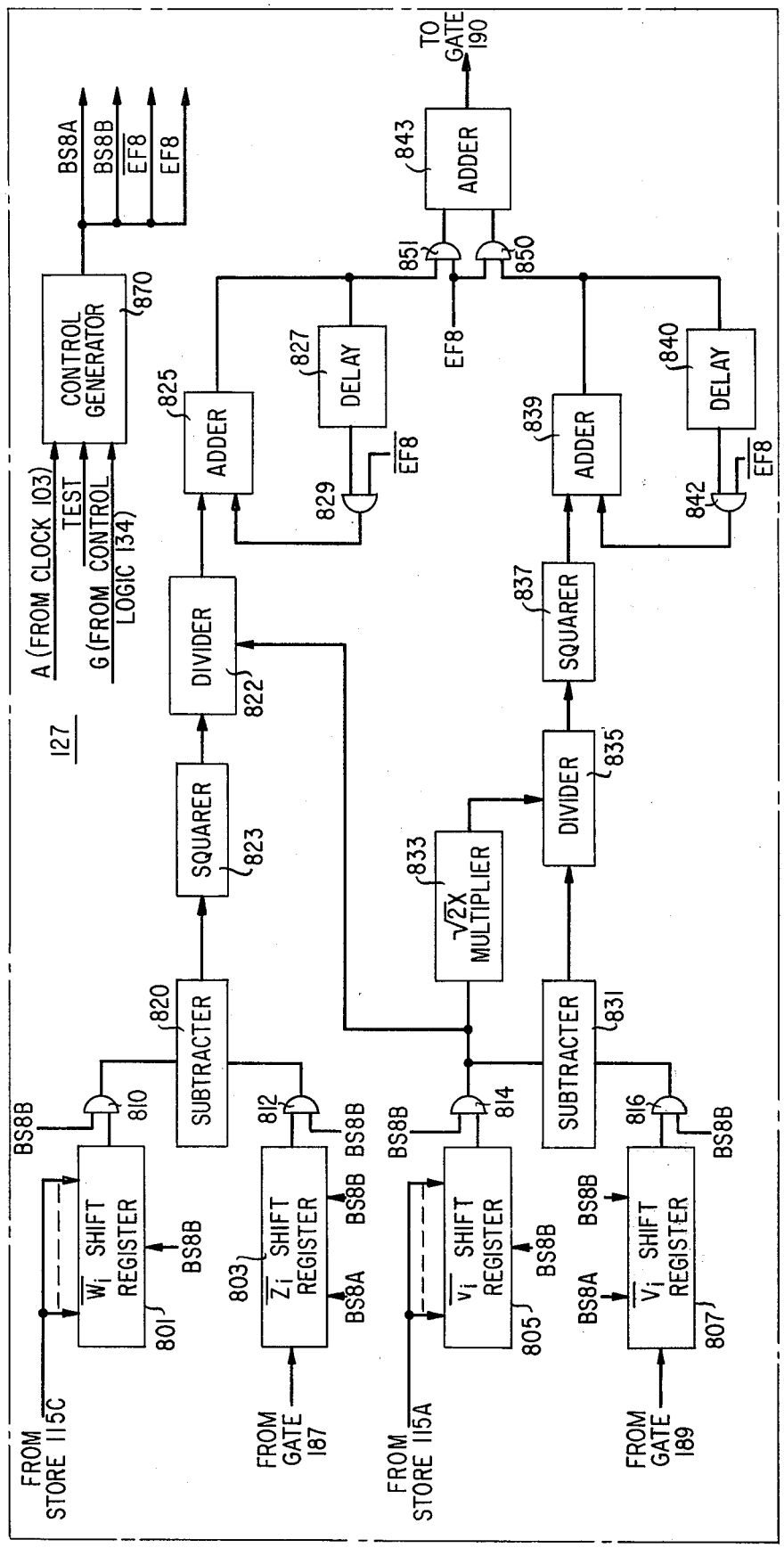
FIG. 8 shows a detailed block diagram of the deviation signal generator of FIGS. 1 and 2.

Deviation signal generator 127 comprises arithmetic units adpated to form the required quotients and the summation of quotients over the indices of Equation (15). FIG. 8 shows an arrangement for producing the deviation signal $d$ in accordance with Equation (15). At the beginning of the test mode, the stored mean values of the reference orthogonal parameters, $\bar{w}_1$ through $\bar{w}_{12}$, of the asserted identity are transferred from store 115c into shift register 801 via gate 181. Similarly, the stored reference variance signals $v_1$ through $v_{12}$ of the asserted identity are transferred from store 115a to shift register 805 via gate 179. At the end of the speech sample of the test speaker, the signals corresponding to the mean values of the test orthogonal parameters $\bar{Z}_1$ through $\bar{Z}_{12}$ are transferred into shift register 803 from test generator 123 via gate 187 under control of signal BS8A from control generator 870, and the variance signals of the test speaker $V_1$ through $V_{12}$ are transferred from generator 123 into shift register 807 via gate 189 under control of signal BS8A. Upon completion of the transfers to registers 805 and 809, gates 810, 812, 814, and 816 are opened by signal BS8B from generator 870 so that the stored coded signals in registers 801, 803, 805, and 807 are sequentially read out at the BS rate (12 signals per frame) under control of the BS8B signal.

Subtractor 820 is operative to subtract the sequentially appearing $\bar{Z}_i$ signals from the corresponding $\bar{w}_i$ signals to form $(\bar{w}_i - \bar{Z}_i)$ signals. The output of subtractor 820 is applied to one input of divider 822 after being processed in squarer circuit 823 and the output of shift register 805 is applied to the other input of divider 822 whereby divider 822 is operative to produce $$\frac{(\bar{w}_i - \bar{Z}_i)^2}{v_i} \text{ signals.}$$

The output of divider circuit 822 is applied to one input of adder 825, which has a second input derived from the feedback loop including delay 827 and gate 829. Adder 825 is operative to sum the 12 successive outputs of squarer circuit 823, and the resulting signal therefrom is $$\sum_{i=1}^{12} \frac{(\bar{w}_i - \bar{Z}_i)^2}{v_i}$$

at the end of the period in which the summation occurs. After the summation, gate 829 is disabled by signal $\overline{EF8}$ and the summation signal is passed through gate 851 under control of signal EF8.

Subtractor 831 operates to subtract the reference variance signals $v_i$ obtained from register 805 from the corresponding test speaker variance signals $V_i$ of register 807. The output of subtractor 831 is applied to divider 835, which has a second input supplied from register 805 via $\sqrt{2}$ times multiplier 833. In this manner, a signal corresponding to $$\frac{V_i - v_i}{\sqrt{2} \, v_i}$$

is generated. Squarer circuit 837 multiplies the output of divider 835 by itself and applies the resulting signal to adder 839. Adder 839 is operative to produce a signal corresponding to $$\sum_{i=1}^{12} \frac{1}{2} \left( \frac{V_i - v_i}{v_i} \right)^2$$

and has one input which is derived from the feedback loop including delay 840 and gate 842. After the summation of the 12 signals in adder 839, gate 842 is disabled by signal $\overline{EF8}$ and gate 850 is opened by signal EF8 from generator 870. The outputs of adders 825 and 840 are then applied via gate 850 and 851 to adder 843 wherein the coded deviation signal in accordance with Equation (15) is produced.

The output of deviation generator 127 is a single signal $d$ indicative of the difference between the test speaker's characteristics and the characteristics of the asserted previously-identified speaker. This signal is applied via gate 190 under control of signal EF8 from generator 870 to one input of comparator 129. The other input of comparator 129 is a coded threshold signal of predetermined magnitude which corresponds to the maximum acceptable deviation for verification of the test speaker. Where the deviation signal from generator 127 is greater than this threshold, a first output of comparator 129 is activated to indicate rejection of test speaker's asserted identity. Where the deviation signal $d$ from generator 127 is equal to or smaller than the threshold code applied to comparator 129, the differences between the test speaker characteristics and the reference characteristics stored in store 115 are such that the speaker's asserted identity is accepted.

Advantageously, the comparison of the orthogonal parameter characteristics in accordance with the invention provides a comparison of characteristics that are very highly speaker dependent and are substantially linquistically independent. The arrangement of the system of FIG. 1 only requires that the reference coefficient signals and the orthogonal parameter signals be generated for storage during the reference mode of operation. Since the orthogonal parameters of the test speaker are not independently produced but are generated from the reference coefficient signals and the prediction parameters of the test speaker, the deviation signal obtained during the test mode of operation is much more sensitive to differences between the reference characteristics and the test characteristics obtained from the system of FIG. 1. Further, the generation of the test orthogonal parameters may be done in a much shorter time thereby facilitating on line verification.

Figure 2:
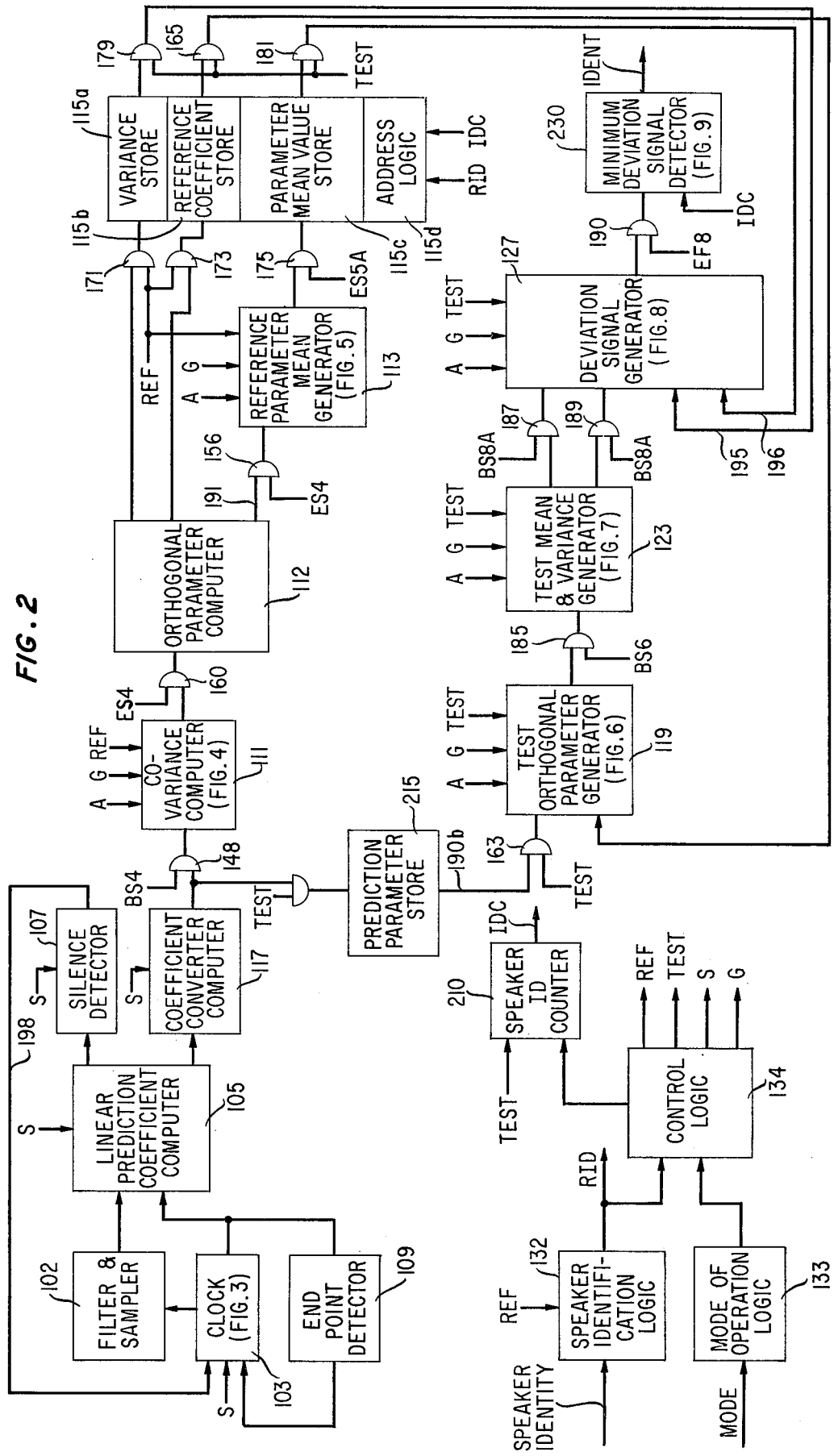
FIG. 2 depicts a block diagram of a speaker identification system illustrative of the invention.

The speaker verification arrangement of FIG. 1 may be modified as shown in FIG. 2 to provide the identification of an unknown speaker as one of a plurality of previously identified speakers. The identification of the unknown speaker requires a comparison of the unknown speaker's derived orthogonal parameter characteristics with the corresponding orthogonal parameter characteristics of each previously identified speaker and the selection of the identity of the closest matched previously identified speaker's orthogonal parameters. Thus, both reference and test modes of operation are needed.

In the reference mode of the speaker identification arrangement, coefficient signals, mean value signals, and variance signals are generated and stored for each identified speaker on the basis of the prescribed set of orthogonal parameter signals derived from a prediction analysis of the speech sample of the identified speaker. The reference mode for speaker identification is substantially identical with the reference mode described in FIG. 1.

In the test mode for speaker identification, a prediction analysis is made of the unknown speaker's utterances and prediction parameters corresponding thereto are obtained and stored. The coefficient signals for the first identified speaker are retrieved from storage and are combined with the prediction signals of the unknown speaker to form a set of test orthogonal prediction parameter signals. The mean values and variances of the formed test orthogonal prediction parameters signals are produced and compared with the stored reference mean values and variances for the first identified speaker. The deviation signal obtained as a result of the comparison is then applied to a minimum deviation signal detector along with the identity code of the first identified speaker. The test operation is repeated for each identified speaker in sequence and the minimum deviation signal is detected and stored together with the corresponding identity. The minimum deviation signal from all the test operations is associated with the identified speaker characteristics that most closely match those derived for the unknown speaker, so that the identity of the unknown speaker is determined.

A speaker identification system illustrative of the invention is shown in FIG. 2. The arrangement of FIG. 2 is substantially similar to the verification system of FIG. 1, except that speaker identification counter 210 is used to control the sequence of test operations needed to compare the derived orthogonal prediction characteristics for the unknown speaker with the corresponding stored characteristics of the plurality of identified speakers. Prediction parameter store 215 is added to provide a source of the unknown speaker's prediction parameters for the sequence of test operations, and minimum deviation signal detector 230 is also added to calculate the minimum deviation signal and store the identity corresponding to said minimum deviation signal.

Referring to FIG. 2, signals REF and S are supplied by control logic 134 during reference mode operations. Responsive to the identity of a known speaker, logic 132 provides reference identification code RID, which is applied to address logic 115d to access the storage locations in which the identified speaker's reference coefficients and means and variance signals are to be placed. The utterances of the identified speaker are sampled in filter and sample circuit 102 and the resulting samples are applied frame by frame to linear prediction coefficient computer 105 as described with respect to FIG. 1. The linear prediction coefficients generated in computer 105, are transformed into selected prediction parameters, e.g., PARCOR parameters, in conversion computer 117, and the generated prediction parameters are supplied to covariance computer 111. The reference orthogonal parameter coefficient signals and variance signals from generator 112 are placed in stores 115a and 115b, respectively, as addressed by logic 115d and the reference orthogonal parameter mean values produced by generator 113 are similarly stored in store 115c. The reference mode operations in FIG. 2 are substantially similar to those described with respect to FIG. 1.

At the beginning of the test mode wherein an unknown speaker's utterances are applied to filter and sample circuit 102, speaker identification counter 210 is initially set so that the address code IDC therefrom corresponds to the first identified speaker. The prediction parameters from conversion computer 117 corresponding to the unknown speaker's utterances are placed in prediction parameter store 215 via gate 148 and are transferred therefrom to test orthogonal parameter generator 119 via gate 163. The stored reference coefficient signals addressed by the IDC code of the first identified speaker are read out of store 115b and applied to generator 119 via gate 165. As aforementioned with respect to FIG. 1, generator 119 is operative to form a prescribed set of orthogonal prediction parameter signals responsive to the stored reference coefficient signals of an identified speaker and the prediction parameters of the unknown speaker. These orthogonal prediction parameter signals are transferred to test mean and variance generator 123 in which the orthogonal parameter mean value and variance signals are formed, as described with respect to FIG. 1.

The reference mean value and variance signals for the first identified speaker are obtained from stores 115a and 115c, respectively, and are applied via gates 179 and 181 to deviation signal generator 127. Responsive to the test mean value and variance signals from generator 123, and the reference mean value and variance signals from stores 115a and 115c, a coded deviation signal is formed in generator 127 which is representative of the differences between the reference and test characteristics. This code deviation signal is transferred to minimum deviation signal detector 230 and counter 210 is augmented so that the next identified speaker is addressed. The test operation is repeated for each identified speaker and detector 230 records the identification of the minimum deviation signal. When the test operation for the last identified speaker is completed, detector 230 contains the identity corresponding to the minimum deviation signal. This identity is read out to provide the identity of the unknown speaker.

FIG. 9 shows a logic arrangement suitable for minimum deviation signal detector 230. In FIG. 9, shift register 903 stores the minimum deviation signal obtained from a comparison of register 903 and register 905 which stores the deviation signal from generator 127. Shift register 901 stores the identification code IDC of the minimum deviation signal. Register 905 stores the current deviation signal and shift register 907 stores the IDC code corresponding to the current deviation signal.

Initially, shift register 903, which stores the minimum deviation signal, is set to its highest possible value. The first deviation signal code obtained from generator 127 at the end of the first test operation is placed in register 905 and the corresponding IDC code is placed in register 907. The deviation signal code from register 903 is applied via gate 934 under control of the DS shift signal from control generator 940 to one input of comparator 913 and is also applied through delay 911 to one input of gate 922. The deviation signal code from register 905 is applied to the other input of comparator 913 via gate 936 and is also applied through delay 915 to gate 924. Since the code in register 905 is smaller than the highest value code in register 903 during the first test operation, comparator 913, which detects which of the two deviation signal codes is smaller, is set to open gate 924 in the presence of the DS2 signal from control generator 940, and the code from register 905 is inserted into register 903 via buffer gate 930. Concurrently, the identification code IDC in register 907 is transferred via gate 926 to register 901. Delays 909, 911, 915, and 917 are of sufficient length to operate selected gates of gates 920, 922, 924 and 928 after the comparison in comparator 913 is completed.

At the end of the next test operation, the second deviation signal code obtained from generator 127 is inserted into register 905 and this deviation code is compared to the deviation code in register 903. The code in register 903 corresponds to the previously obtained minimum deviation code. Comparator 913 is operative to permit the smaller of the codes in registers 903 and 905 to be inserted in register 903 and is also operative to allow the transfer of the identification code corresponding to the lesser deviation signal to in register 901. In this manner, at the end of each test operation, the lesser deviation signal code is selected by comparator 913 and is stored in register 903. At the end of the final test operation, the minimum deviation signal resulting from the test operations is stored in register 903 and the corresponding identification code is stored in register 901. The identification code in register 901 at this time is that of the identified speaker whose orthogonal parameter characteristics most closely match the orthogonal parameter characteristics of the unknown speaker. In accordance with the invention, the unknown speaker is thereby identified.

While the invention has been particularly shown and described with reference to particular illustrative embodiments, it will be understood by those skilled in the art that modifications and changes in form and detail may be made without departing from the scope and spirit of the invention

What is claimed is:

1. A speaker recognition system comprising means for forming a set of reference prediction parameter signals from a prediction anaylsis of the utterances of an identified speaker, means responsive to said reference prediction parameter signals for generating a prescribed set of reference coefficient signals adapted to transform said reference prediction parameter signals into a set of signals representative of the identity of said identified speaker, means jointly responsive to said reference prediction parameter signals and said reference coefficient signals for generating a set of first signals characteristic of the identity of said identified speaker, means for forming a set of test prediction parameter signals from a prediction analysis of the utterances of an unknown speaker, means jointly responsive to said reference coefficient signals generated for said identified speaker and said test prediction parameter signls generated for said unknown speaker for producing a prescribed set of second signals characteristic of an hypothesized identity of the unknown speaker with reference to said identified speaker, and means for comparing said prescribed set of first signals with said prescribed set of second signals to verify said hypothesized identity of said unknown speaker as said identified speaker.

2. A speaker recognition system according to claim 1 wherein said means for generating said set of first signals comprises means for generating a set of orthogonal prediction parameter signals representative of the identity of said identified speaker, and means responsive to said orthogonal prediction parameter signals for producing a set of signals representative of the means values of said orthogonal prediction parameter signals over the utterances of said identified speaker.

3. A speaker recognition system according to claim 2 wherein said means for generating said prescribed set of second signals comprises means for combining said reference coefficient signals of said identified speaker with said test prediction parameter signals of said unknown speaker to form a set of test orthogonal prediction parameter signals representative of the hypothesized identity of said unknown speaker with reference to said identified speaker, and means responsive to said test orthogonal prediction parameter signals for producing a set of signals representative of the means values of said test orthogonal prediction parameter signals, and said comparing means comprises means for comparing said reference orthogonal prediction parameter mean value signals with said test orthogonal prediction parameter mean value signals.

4. A speaker recognition system according to claim 3 wherein said orthogonal prediction parameter value comparing means comprises means for generating a third signal representative of the differences between said reference orthogonal prediction parameter mean value signals and said test orthogonal prediction parameter mean value signals.

5. A speaker recognition system according to claim 4, further comprising means for producing a threshold signal representative of the acceptable differences between said reference and test orthogonal prediction parameter mean value signals, and means for comparing said third signal with said threshold signal to verify said unknown speaker's hypothesized identity as said identified speaker.

6. A speaker recognition system comprising means for forming a set of reference prediction parameter signals from the utterances of each of a plurality of identified speakers, means responsive to each set of reference prediction parameter signals for generating and storing a set of reference prediction coefficient signals adapted to transform said reference prediction parameter signals into signals representative of the identity of said identified speaker, means jointly responsive to said reference coefficient signals and said reference prediction parameter signals for generating and storing a set of first signals characteristic of the identity of said identified speaker, means jointly responsive to the utterances of an unknown speaker and the stored reference prediction coefficient signals of each identified speaker for forming a set of test prediction parameter signals corresponding to an hypothesized identity for said unknown speaker with respect to said identified speaker, means responsive to said test prediction parameter signals for each identified speaker for generating a second set of signals characteristic of said hypothesized identity for the unknown speaker with respect to said identified speaker for each identified speaker, and means for comparing the set of first signals with the set of second signals for each identified speaker whereby the unknown speaker's hypothesized identity is verified for one of said identified speakers.

7. A speaker recognition system according to claim 6 wherein the means for generating said first signals comprises means for generating a prescribed set of orthogonal prediction parameter signals from said prediction parameter signals of said identified speaker's utterances and said identified speaker's reference coefficient signals, and means for generating signals representative of the mean values of said orthogonal prediction parameter signals, said means for forming said test prediction parameter signals comprises means jointly responsive to a prediction analysis of said unknown speaker and said set of reference prediction coefficient signals of said identified speaker for generating a prescribed set of test orthogonal prediction parameter signals, and said second signal generating means comprises means responsive to said test prediction parameter signals for generating signals representative of the mean values of said test orthogonal prediction parameter signals.

8. A speaker recognition system according to claim 7 wherein said comparing means comprises means for producing a third signal representative of the differences between said reference prediction parameter mean value signals and said test orthogonal prediction parameter mean value signals.

9. A speaker recognition system according to claim 8, further comprising means responsive to the third signals produced by said comparing means for each identified speaker for detecting the minimum of said third signals, said minimum third signal being representative of the closest match between said reference orthogonal prediction parameter means value signals of said identified speakers and the corresponding thest orthogonal production parameter mean value signals, and means for producing an identification signal corresponding to the identified speaker for which said minimum third signal is produced.

10. A speaker recognition system comprising means for forming a set of reference prediction parameter signals from the utterances of each of a plurality of identified speakers, means responsive to each set of reference prediction parameter signals for generating and storing a set of reference prediction coefficient signals corresponding to an eigenvector analysis of said reference prediction parameter signals and adapted to transform said reference prediction parameter signals into a set of signals representative of the identity of said identified speaker, means jointly responsive to said reference prediction coefficient signals and said reference prediction parameter signals for producing a set of first signals characteristic of the identity of said indentified speaker, means jointly responsive to the utterances of an unknown speaker asserting the identity of a selected identified speaker and the stored prediction coefficient signals of said selected identified speaker for forming a set of test prediction parameter signals representative of the asserted identity of said unknown speaker as said identified speaker, means responsive to said test prediction parameter signals for generating a set of second signals characteristic of the asserted identity of said unknown speaker, and means for comprising the set of first signals of each selected identified speaker with the set of second signals of the asserted identity of said unknown speaker as said identified speaker to verify said asserted identity.

11. A speaker recognition system according to claim 10 wherein said means for forming said first signals comprises means for generating a prescribed set of reference orthogonal prediction parameter signals from said prediction parameter signals of said identified speaker's utterances and said reference prediction coefficient signals of said selected identified speaker, and means for generating signals representative of the mean values of said reference orthogonal prediction parameter signals, said means for forming said test prediction parameter signals comprises means jointly responsive to a prediction analysis of said unknown speaker's utterances and said stored reference prediction coefficient signals of said selected identified speaker for generating a prescribed set of test orthogonal prediction parameter signals corresponding to the asserted identity of the unknown speaker as said selected identified speaker, and said second signal generating means comprises means responsive to said test orthogonal prediction parameters for generating signals representative of the mean values of said test orthogonal prediction parameter signals.

12. A speaker recognition system according to claim 11 wherein said comparing means comprises means for producing a third signal representative of the differences between said reference prediction parameter mean value signals of said selected identified speaker and the test prediction parameter mean value signals of the asserted identity of said unknown speaker as said selected identified speaker.

13. A speaker recognition system according to claim 12 further comprising means for generating a threshold signal representative of acceptable differences between said reference prediction parameter mean value signals and said test prediction parameter mean value signals, and means for comparing said third signal with said threshold signal to verify the asserted identity of said unknown speaker as said selected identified speaker.

14. A speaker recognition system comprising means responsive to utterances of an identified speaker for generating prediction parameter signals for said identified speaker, means responsive to said identified speaker's prediction parameter signals for producing a set of reference coefficient signals adapted to convert said prediction parameter signals into a set of signals representative of the identity of said identified speaker, means jointly responsive to said identified speaker's prediction parameter signals and said identified speaker's reference coefficient signals for generating first signals representative of a set of orthogonal parameters of a linear prediction analysis of said identified speaker's utterances corresponding to the identity of said identified speaker, means responsive to said first signals for producing a set of second signals representative of the mean values and variances of said first signals, means responsive to the utterances of an unknown speaker for generating a set of third signals representative of a linear prediction analysis of said unknown speaker's utterances, means jointly responsive to said third signals and said reference coefficient signals of said identified speaker for producing a set of test orthogonal prediction parameter signals corresponding to an hypothesized identity of said unknown speaker as said identified speaker, means responsive to said test orthogonal parameter signals for generating a set of fourth signals representative of the means values and variances of said test orthogonal parameter signals, and means for comparing said second signals and said fourth signals to verify said hypothesized identity of said unknown speaker as said identified speaker.

15. A speaker recognition system according to claim 14 wherein said utterances of said identified speaker comprises a predetermined set of utterances.

16. A speaker recognition system according to claim 15 wherein the utterances of said unknown speaker comprises said predetermined set of utterances.

17. A speaker recognition system comprising means responsive to the utterances of each of a plurality of identified speakers for generating a set of prediction parameter signals for said identified speaker, means responsive to said identified speaker's prediction parameter signals for generating and storing a unique set of reference coefficient signals for transforming said prediction parameter signals into a set of signals corresponding to the physical identity of said identified speaker, means jointly responsive to said identified speaker's prediction parameter signals and said identified speaker's reference coefficient signals for producing first signals for said identified speaker representative of a set of orthogonal parameters corresponding to the identity of said identified speaker, means responsive to said first signals of each identified speaker for producing and storing a set of second signals representative of the mean values and variances of said first signals, means responsive to the utterances of an unknown speaker for generating a third set of signals representative of a linear prediction analysis of said unknown speaker's utterances, means jointly responsive to said third signals and the stored reference coefficient signals of a selected identified speaker for forming a set of test orthogonal parameter signals representative of an hypothesized identity of the unknown speaker as said selected identified speaker, means responsive to said test orthogonal parameter signals for generating a set of fourth signals represenative of the mean values and variances of said test orthogonal parameter signals, and means jointly responsive to said second signals of said selected identified speaker and said fourth signals of the hypothesized identity of said unknown speaker as said selected indentified speaker for generating a fifth signal representative of the differences between said second and fourth signals to verify the hypothesized identity of said unknown speaker as said selected identified speaker.

18. A speaker recognition system according to claim 17, further comprising means for producing a predetermined threshold signal, and means for comparing said fifth signal with said predetermined threshold signal whereby the hypothesized identity of the unknown speaker as the selected identified speaker is verified.

19. A speaker recognition system comprising means responsive to the utterances of each of a plurality of identified speakers for generating a set of prediction parameter signals for each identified speaker, means for generating a set of reference coefficient signals adapted to transform each identified speaker's prediction parameter signals into a set of signals uniquely representative of said identified speaker, means for combining each identified speaker's prediction parameter signals with the same speaker's reference coefficient to form a set of first signals for each identified speaker representative of a set of orthogonal parameters uniquely identifying said identified speaker, means responsive to said first signals of each identified speaker for producing and storing a set of second signals representative of the mean values and variances of the first signals, means responsive to the utterances of an unknown speaker for generating a set of third signals representative of a linear prediction analysis of said unknown speaker's utterances, means for combining said third signals with the stored reference coefficient signals of each identified speaker for forming for each set of reference coefficient signals a set of test orthogonal parameter signals representative of an hypothesized identity of said unknown speaker as said identified speaker, means responsive to each set of test orthogonal parameter signals for generating a set of fourth signals representative of the mean values and variances of said test orthogonal parameter signals of each hypothesized identity of said unknown speaker as said identified speaker, and means responsive to a comparison of each set of fourth signals and the corresponding set of second signals for forming a fifth signal representative of the differences between said fourth signals and the corresponding second signals to verify the hypothesized identity of said unknown speaker as one of said identified speakers.

20. A speaker recognition system according to claim 19, further comprising means responsive to said fifth signals for detecting the minimum fifth signal whereby the identity of the unknown speaker is determined.

21. A method for recognizing the identity of an unknown speaker comprising the steps of forming a set of reference prediction parameter signals from a prediction analysis of a speech sample of an identified speaker, generating a set of reference coefficient signals adapted to transform said reference prediction parameter signals into a set of signals representative of the physical identity of said identified speaker, generating a set of first signals characteristic of the physical identity of said identified speaker by combining said reference prediction parameter signals with said set of reference coefficient signals, forming a set of test prediction parameter signals representative of an hypothesized identity of said unknown speaker with reference to said identified speaker from a prediction analysis of a speech sample of said unknown speaker and the reference coefficient signals of said identified speaker, generating a set of second signals from said test prediction parameter signals characteristic of the hypothesized identity of said unknown speaker with reference to said identified speaker, and comparing said first signals with said second signals to verify the hypothesized identity of said unknown speaker as said identified speaker.

22. A method for recognizing the identity of an unknown speaker according to claim 21 wherein said set of first signals comprises a set of signals representative of the mean values of orthogonal prediction parameter signals obtained by combining said reference prediction parameter signals and said reference coefficient signals of said identified speaker, said set of test prediction parameter signals is a set of test orthogonal prediction parameter signals, and said set of second signals comprises signals representative of the mean values of said test orthogonal parameter signals.

23. A method for recognizing the identity of an unknown speaker according to claim 22 wherein said set of first signals further comprises a set of signals representative of the variances of said reference orthogonal prediction parameter signals, and said set of second signals further comprises a set of signals representative of the variances of said test orthogonal parameter signals.

24. A method for identifying an unknown speaker comprising the steps of forming a set of reference prediction parameter signals from a prediction analysis of a speech sample of each of a plurality of identified speakers, generating a set of reference transformation coefficient signals for transforming each identified speaker's prediction parameters into a set of signals representative of the identity of said identified speaker, generating a set of first signals characteristic of the identity of said identified speaker by combining the reference prediction parameter signals of each of said identified speakers with the set of reference prediction coefficient signals of the same identified speaker, forming a set of test prediction parameter signals for said unknown speaker which corresponds to the hypothesized identity of the unknown speaker as each identified speaker by combining prediction parameter signals obtained from a prediction analysis of a speech sample of said unknown speaker with the reference prediction coefficient signals of said identified speaker, generating a set of second signals characteristic of an hypothesized identity of the unknown speaker with respect to each identified speaker from said test prediction parameter signals, and comparing said first signals characteristic of each identified speaker with the corresponding second signals characteristic of the hypothesized identity of the unknown speaker as said identified speaker.

25. A method for identifying an unknown speaker according to claim 24 wherein the comparison of said first signals of each identified speaker with the corresponding second signals comprises forming a third signal representative of the differences between said first signals of each identified speaker and said corresponding second signals, and further comprises detecting the minimum third signal to determine the identity of said unknown speaker.

26. A method for identifying an unknown speaker according to claim 25 wherein each set of first signals is a set of mean values of orthogonal parameter signals formed by combining the identified speaker's prediction parameter signals with said identified speaker's reference coefficient signals over the speech sample of said identified speaker, each set of test prediction parameter signals is a set of test orthogonal parameter signals, and each set of second signals comprises signals representative of the mean values of said test orthogonal parameter signals.

27. A method for identifying an unknown speaker according to claim 26 wherein said set of first signals further comprises a set of signals representative of the variances of said reference orthogonal parameter signals, and said set of second signals further comprises a set of signals representative of the variances of said test orthogonal parameter signals.

28. A method for verifying the asserted identity of an unknown speaker comprising the steps of forming a set of reference prediction parameter signals from a prediction analysis of a speech sample of each of a plurality of identified speakers, generating a set of reference coefficient signals for each identified speaker adapted to transform said identified speaker's reference prediction parameter signals into a set of signals representative of the identity of said identified speaker, generating a set of first signals by combining the reference prediction parameter signals of each identified speaker with the set of reference prediction coefficient signals for the same identified speaker, forming a set of test prediction parameter signals corresponding to the asserted identity of said unknown speaker by combining prediction parameter signals obtained from a prediction analysis of a speech sample of said unknown speaker with the reference coefficient prediction signals of said asserted identity, generating a set of second signals characteristic of said asserted identity from said test prediction parameter signals representative of the asserted identity of said unknown speaker, and comparing said first signals characteristic of the identity of said identified speaker with said second signals characteristic of the asserted identity of said unknown speaker as said identified speaker.

29. A method for verification of the asserted identity of an unknown speaker according to claim 28 wherein the comparison of said first signals and said second signals comprises forming a third signal representative of the differences between said first signals and said second signals, and further comprises generating a verification threshold signal, and comparing said third signal to said verification threshold signal whereby the asserted identity of said unknown speaker is accepted or rejected.

30. A method for verification of the asserted identity of an unknown speaker according to claim 29 wherein each set of first signals comprises a set of signals representative of the mean values of reference orthogonal parameter signals formed by combining the prediction parameter signals and the reference coefficient signals of the identified speaker over the speech sample of said identified speaker, said set of test prediction parameter signals for said asserted identity is a set of test orthogonal parameter signals, and each set of second signals comprises signals representative of the mean values of said test orthogonal parameter signals.

31. A method for the verification of the asserted identity of an unknown speaker according to claim 30 wherein said set of first signals further comprises a set of signals representative of the variances of said orthogonal parameter signals, and said set of second signals further comprises a set of signals representative of the variances of said test orthogonal signals.

* * * * *

UNITED STATES PATENT AND TRADEMARK OFFICE
CERTIFICATE OF CORRECTION

PATENT NO. : 4,032,711
DATED : June 28, 1977
INVENTOR(S) : Marvin R. Sambur

It is certified that error appears in the above-identified patent and that said Letters Patent are hereby corrected as shown below:

Column 1, line 6, "particularly,," should read --particularly--; line 43, "utternance" should read --utterance--; line 46, "utternance" should read --utterance--; line 54, after "utterance", a period should be inserted. Column 2, line 57, the word "te" should read --the--. Column 3, lines 29 and 30, after "invention", the word "of" should be deleted; line 32, after "speaker's", the words --orthogonal parameter-- should be inserted. Column 7, line 26, "$a_{12\ 12}$" should read --$a_{12}$--; line 36, "Tra jectory" should read --Trajectory--. Column 9, line 65, "$x_1,..$" should read --$x_1,...$--. Column 10, line 11, "regisster" should read --register--; line 29, after "2", a comma should be inserted. Column 11, line 57, "1,," should read --1,--. Column 13, line 63, after "values", "$w_1$" should read --$\bar{w}_1$--. Column 15, line 2, "registers" should read --register--; line 11, "outputs" should read --output--; line 31, "frame" should read --frame.--. Column 16, line 63, after "coefficient", the word --signals-- should be inserted. Column 17, line 10, "adpated" should read --adapted--. Column 21, line 63, "signls" should read --signals--. Column 22, line 9, "means" should read --mean--; line 22, "means" should read --mean--. Column 23, line 36, "thest" should read --test--; lines 54 and 55, "indentified" should read --identified--; lines 64 and 65, "comprising" should read --comparing--. Column 24, line 66, "means" should read

UNITED STATES PATENT AND TRADEMARK OFFICE
CERTIFICATE OF CORRECTION

PATENT NO. : 4,032,711

DATED : June 28, 1977

Page 2 of 2

INVENTOR(S) : Marvin R. Sambur

It is certified that error appears in the above-identified patent and that said Letters Patent are hereby corrected as shown below:

--mean--. Claim 25, line 42, "indentified" should read --identified--.

Signed and Sealed this

First Day of November 1977

[SEAL]

Attest:

RUTH C. MASON
*Attesting Officer*

LUTRELLE F. PARKER
*Acting Commissioner of Patents and Trademarks*